(12) United States Patent
Shibata

(10) Patent No.: US 10,264,153 B2
(45) Date of Patent: Apr. 16, 2019

(54) INFORMATION PROCESSING APPARATUS, METHOD FOR CONTROLLING INFORMATION PROCESSING APPARATUS, IMAGE FORMING APPARATUS, METHOD FOR CONTROLLING IMAGE FORMING APPARATUS, AND INFORMATION PROCESSING SYSTEM

(71) Applicant: CANON KABUSHIKI KAISHA, Tokyo (JP)

(72) Inventor: Daisuke Shibata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/902,932

(22) Filed: Feb. 22, 2018

(65) Prior Publication Data

US 2018/0183965 A1 Jun. 28, 2018

Related U.S. Application Data

(63) Continuation of application No. 15/227,744, filed on Aug. 3, 2016, now Pat. No. 9,930,203.

(30) Foreign Application Priority Data

Aug. 7, 2015 (JP) .................................. 2015-157602
Jun. 16, 2016 (JP) .................................. 2016-119846

(51) Int. Cl.
*G06F 3/12* (2006.01)
*H04N 1/00* (2006.01)
*H04N 1/32* (2006.01)

(52) U.S. Cl.
CPC ..... *H04N 1/00973* (2013.01); *H04N 1/00344* (2013.01); *H04N 1/00347* (2013.01); *H04N 1/32101* (2013.01); *H04N 2201/0039* (2013.01); *H04N 2201/0094* (2013.01)

(58) Field of Classification Search
CPC .......... H04N 1/00344; H04N 1/00347; H04N 1/00973; H04N 1/32101
USPC ....................................................... 358/1.15
See application file for complete search history.

(56) References Cited

U.S. PATENT DOCUMENTS 8,775,943 B2 * 7/2014 Paek .................. H04L 41/0816
715/740
2014/0139871 A1 * 5/2014 Igarashi ............. H04N 1/00344
358/1.15
2015/0189116 A1 * 7/2015 Ito ...................... H04N 1/00973
358/1.13

* cited by examiner

*Primary Examiner* — Neil R McLean
(74) *Attorney, Agent, or Firm* — Canon U.S.A., Inc. IP Division

(57) ABSTRACT

An information processing apparatus is configured in the following manner. When a client is connected to a server, the client transmits all of setting information that the client handles as a synchronization target to the server. The server returns an error response to prohibit synchronization in response to transmission of a setting item that the server does not handle as the synchronization target among the setting information transmitted from the client. After that, the client apparatus does not notify the server of a content of an update with respect to the setting information of the setting item to which the error response is returned when the client is connected to the server.

11 Claims, 14 Drawing Sheets

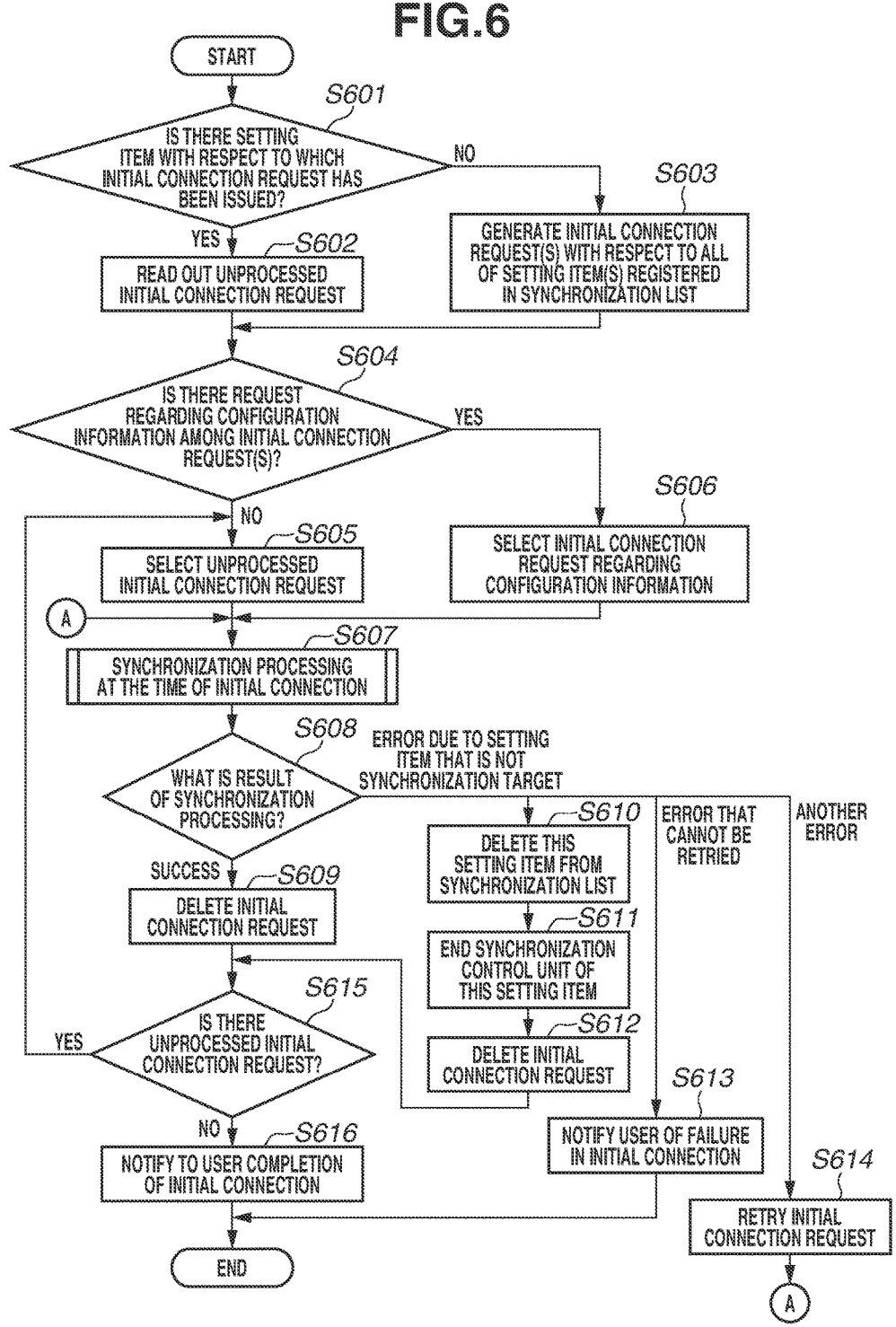

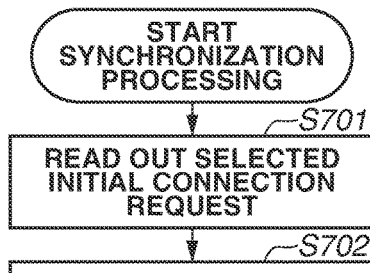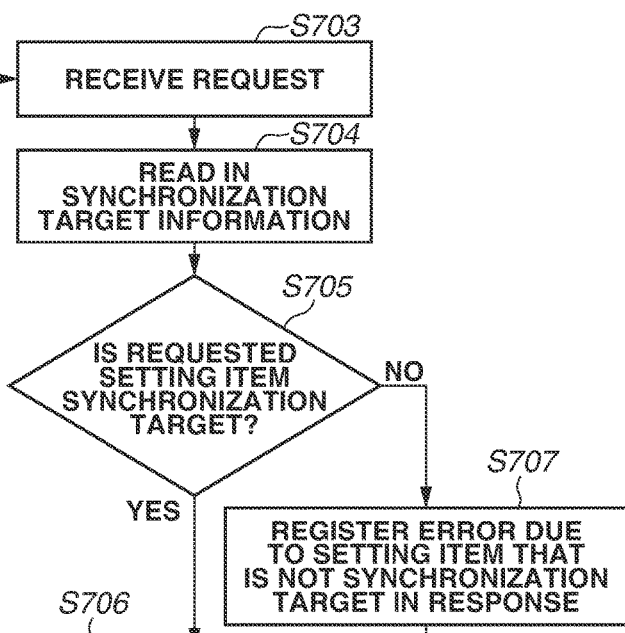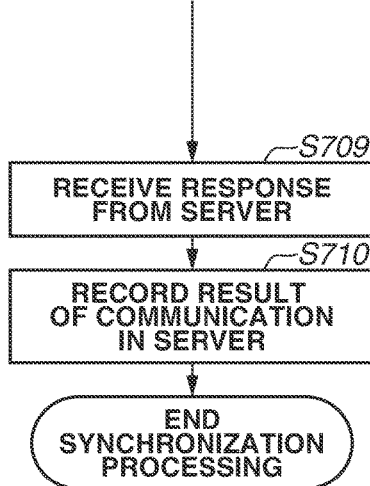

FIG.9A

SET SYNCHRONIZATION TARGET

[ OK ]

| SETTING ITEM | SYNCHRONIZATION TARGET/ NOT SYNCHRONIZATION TARGET | |
|---|---|---|
| DEVICE SETTING VALUES | ● TARGET | ○ NOT TARGET |
| USER DATA | ● TARGET | ○ NOT TARGET |
| ADDRESS BOOK | ○ TARGET | ● NOT TARGET |
| GROUP INFORMATION | ○ TARGET | ● NOT TARGET |

FIG.9B

SET SYNCHRONIZATION TARGET

[ OK ]

SETTING OF SYNCHRONIZATION TARGET CANNOT BE CHANGED DUE TO PRESENCE OF DEVICE IN CONNECTION.

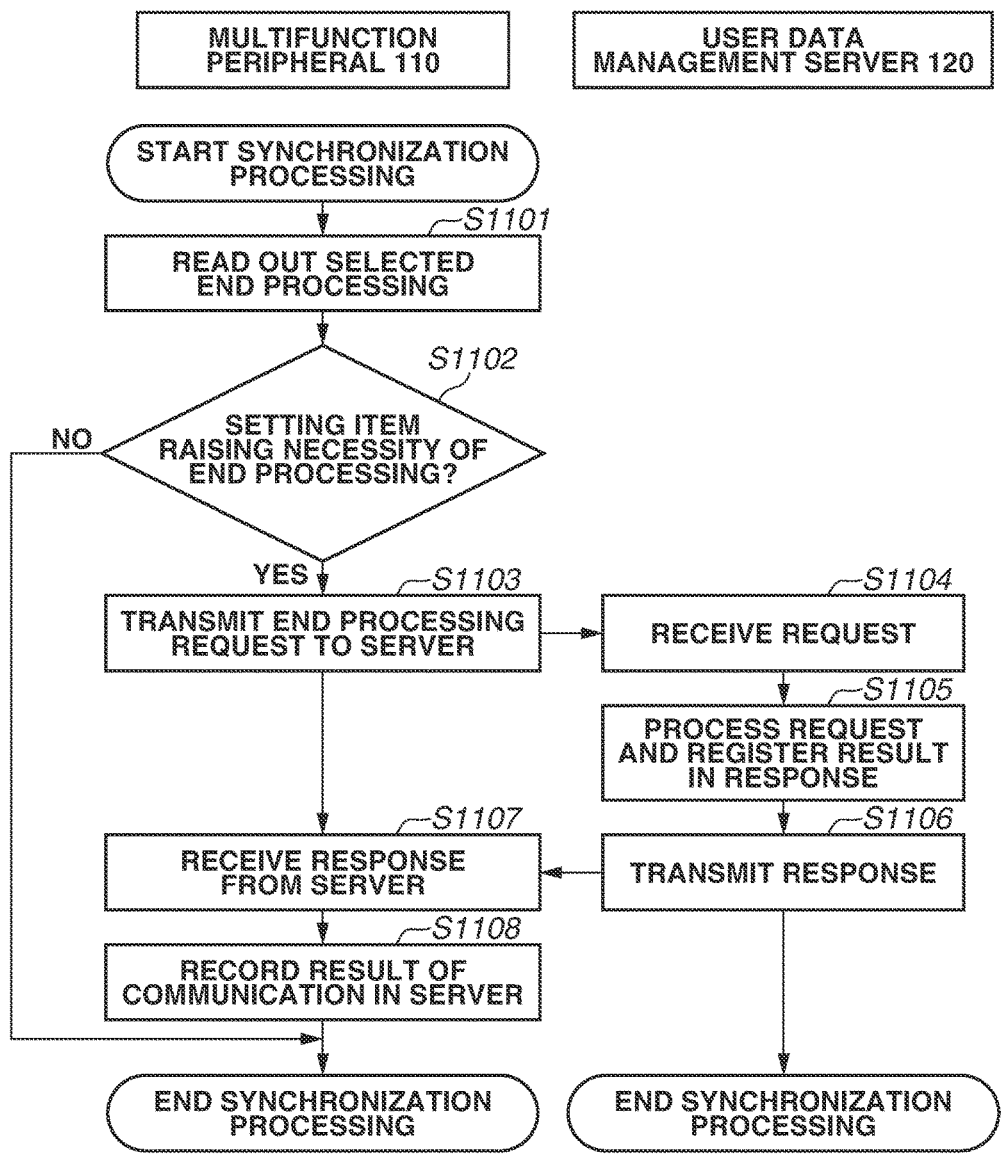

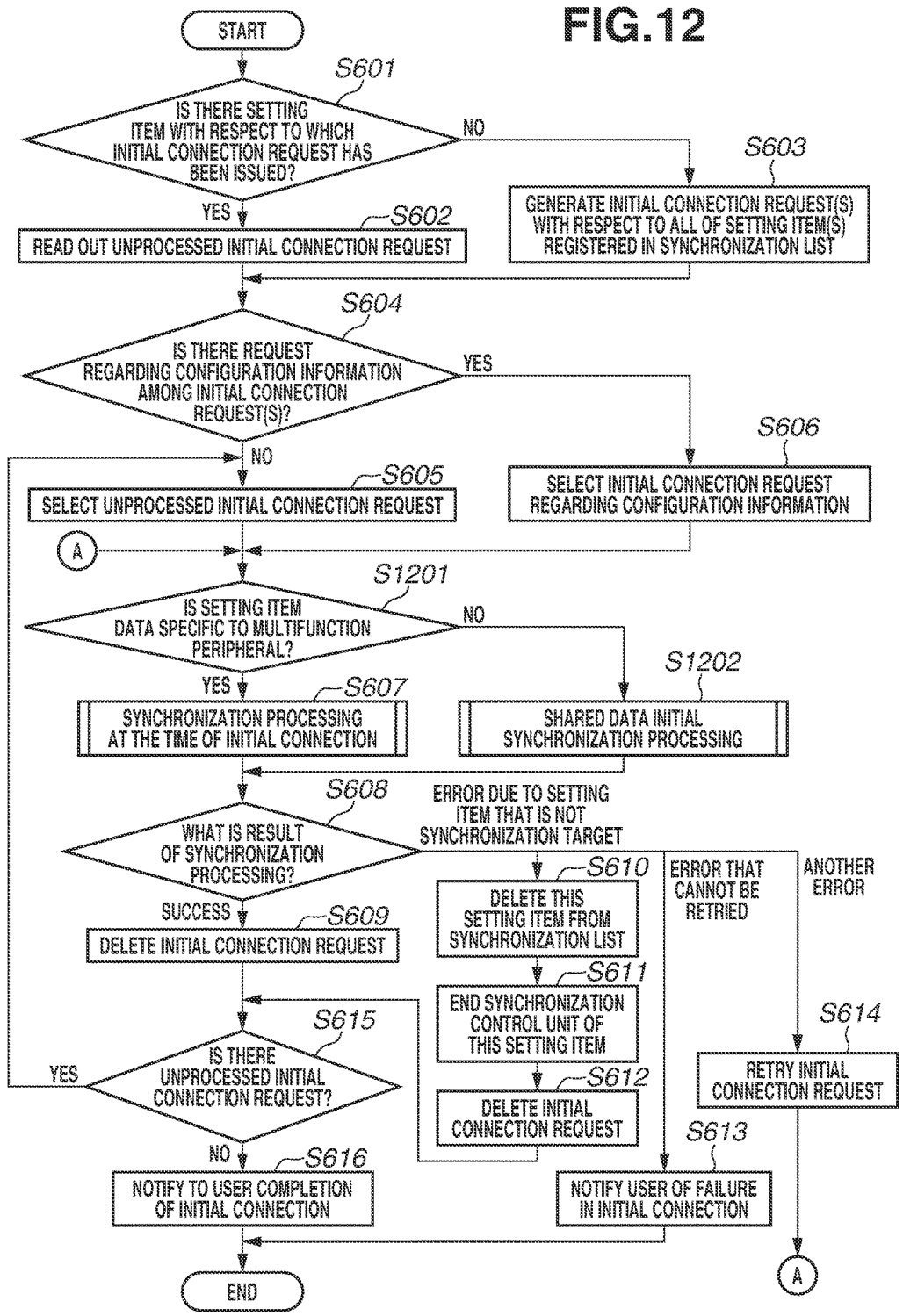

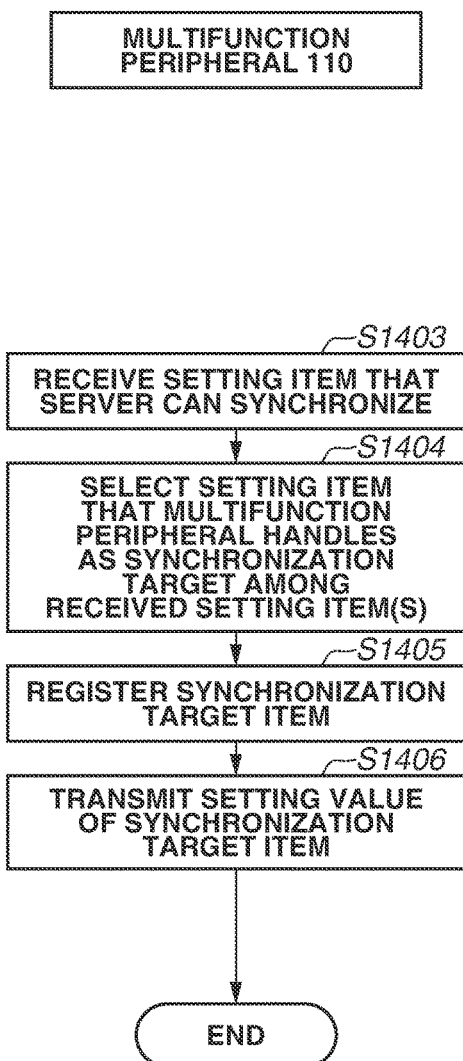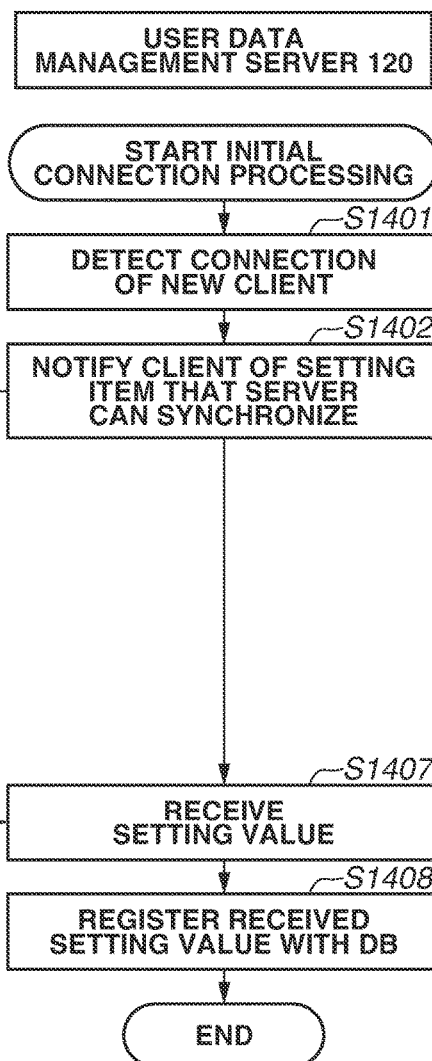

INFORMATION PROCESSING APPARATUS, METHOD FOR CONTROLLING INFORMATION PROCESSING APPARATUS, IMAGE FORMING APPARATUS, METHOD FOR CONTROLLING IMAGE FORMING APPARATUS, AND INFORMATION PROCESSING SYSTEM

CROSS-REFERENCE TO RELATED APPLICATIONS

This application is a Continuation of U.S. patent application Ser. No. 15/227,744, filed Aug. 3, 2016, which claims the benefit of Japanese Patent Application No. 2015-157602, filed Aug. 7, 2015, and Japanese Patent Application No. 2016-119846, filed Jun. 16, 2016, all of which are hereby incorporated by reference herein in their entirety.

BACKGROUND OF THE INVENTION

Field of the Invention

The present invention relates to an information processing system in which setting information is shared between or among a plurality of information processing apparatuses.

Description of the Related Art

Conventionally, there have been known sharing systems in which information is shared between a server and a client. Japanese Patent Application Laid-Open No. 2004-94294 discusses an information sharing system in which a content of setting information held by the client is transmitted from the client to the server.

Further, Japanese Patent Application Laid-Open No. 2012-123573 discusses an information sharing system in which the setting information of the client is shared between the server and the client, and the client manages setting information handled as a synchronization target and setting information not handled as the synchronization target.

The above-described conventional technique is not constructed considering that the server side sets the setting information handled as the synchronization target and the setting information not handled as the synchronization target. Therefore, an image forming apparatus according to the above-described conventional technique transmits even the setting information that the server does not handle as the target of the synchronization, to the server when a predetermined synchronization timing arrives. Therefore, a load of unnecessary data processing and communication is undesirably placed.

SUMMARY OF THE INVENTION

According to an aspect of the present invention, an information processing apparatus includes at least one processor and at least one memory coupled to the processor. The processor and the memory act as a management unit configured to manage setting information regarding a setting of an image forming apparatus, a reception unit configured to receive the setting information held by the image forming apparatus from the image forming apparatus when the image forming apparatus is connected to the information processing apparatus and receive information indicating a content of an update made to the setting information from the image forming apparatus when the setting information held by the image forming apparatus is updated after the image forming apparatus is connected to the information processing apparatus, and a transmission unit configured to transmit a response indicating whether to transmit the information indicating the content of the update from the image forming apparatus to the information processing apparatus, to the image forming apparatus for each setting item of the setting information as a response to the reception of the setting information when the image forming apparatus is connected to the information processing apparatus.

According to another aspect of the present invention, an information processing apparatus includes at least one processor and at least one memory coupled to the processor. The processor and the memory act as a management unit configured to manage setting information regarding a setting of an image forming apparatus, a reception unit configured to receive information indicating a content of an update made to the setting information from the image forming apparatus when the setting information held by the image forming apparatus is updated after the image forming apparatus is connected to the information processing apparatus, and a transmission unit configured to transmit information for identifying a setting item with respect to which the image forming apparatus transmits the information indicating the content of the update to the information processing apparatus, to the image forming apparatus when the image forming apparatus is connected to the information processing apparatus.

According to another aspect of the present invention, an image forming apparatus includes at least one processor and at least one memory coupled to the processor. The processor and the memory act as a holding unit configured to hold setting information regarding a setting of the image forming apparatus, a transmission unit configured to transmit the setting information held in the holding unit to an information processing apparatus when the image forming apparatus is connected to the information processing apparatus and transmit information indicating a content of an update made to the setting information to the information processing apparatus when the setting information held in the holding unit is updated after the image forming apparatus is connected to the information processing apparatus, a reception unit configured to receive a response to the transmission of the setting information when the image forming apparatus is connected to the information processing apparatus from the information processing apparatus for each setting item of the setting information, and a control unit configured to control the transmission unit so as not to transmit the information indicating the content of the update to the information processing apparatus with respect to the setting information of the setting item for which a predetermined response is received as the response.

Further features of the present invention will become apparent from the following description of exemplary embodiments with reference to the attached drawings.

BRIEF DESCRIPTION OF THE DRAWINGS

Brief Description of Drawings

Figure 1:
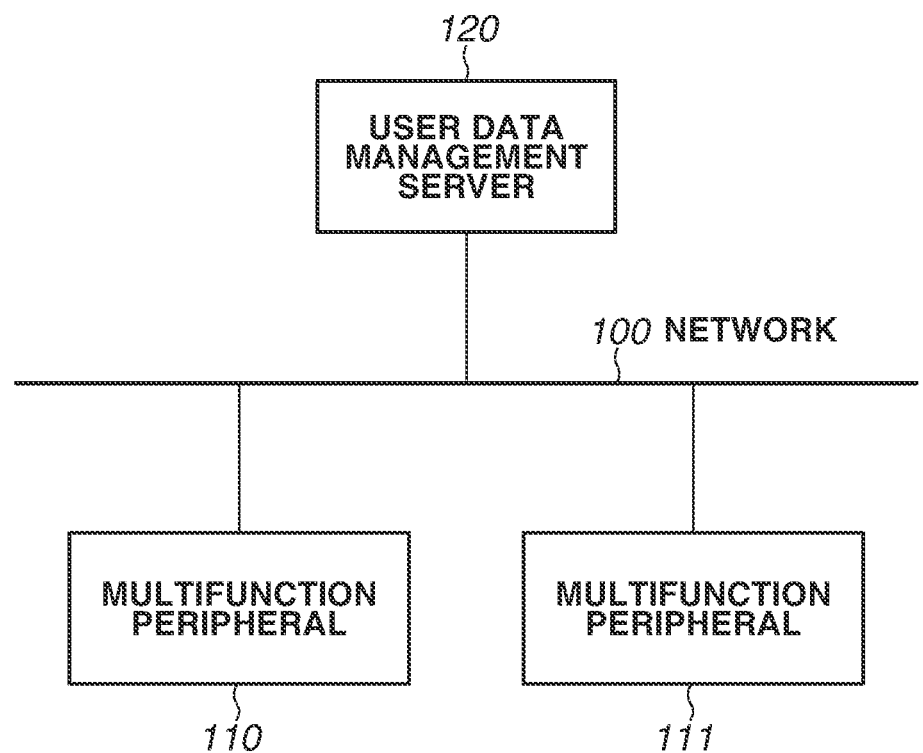

FIG. 1 illustrates a system configuration indicating an entire system according to a first exemplary embodiment.

Figure 2:
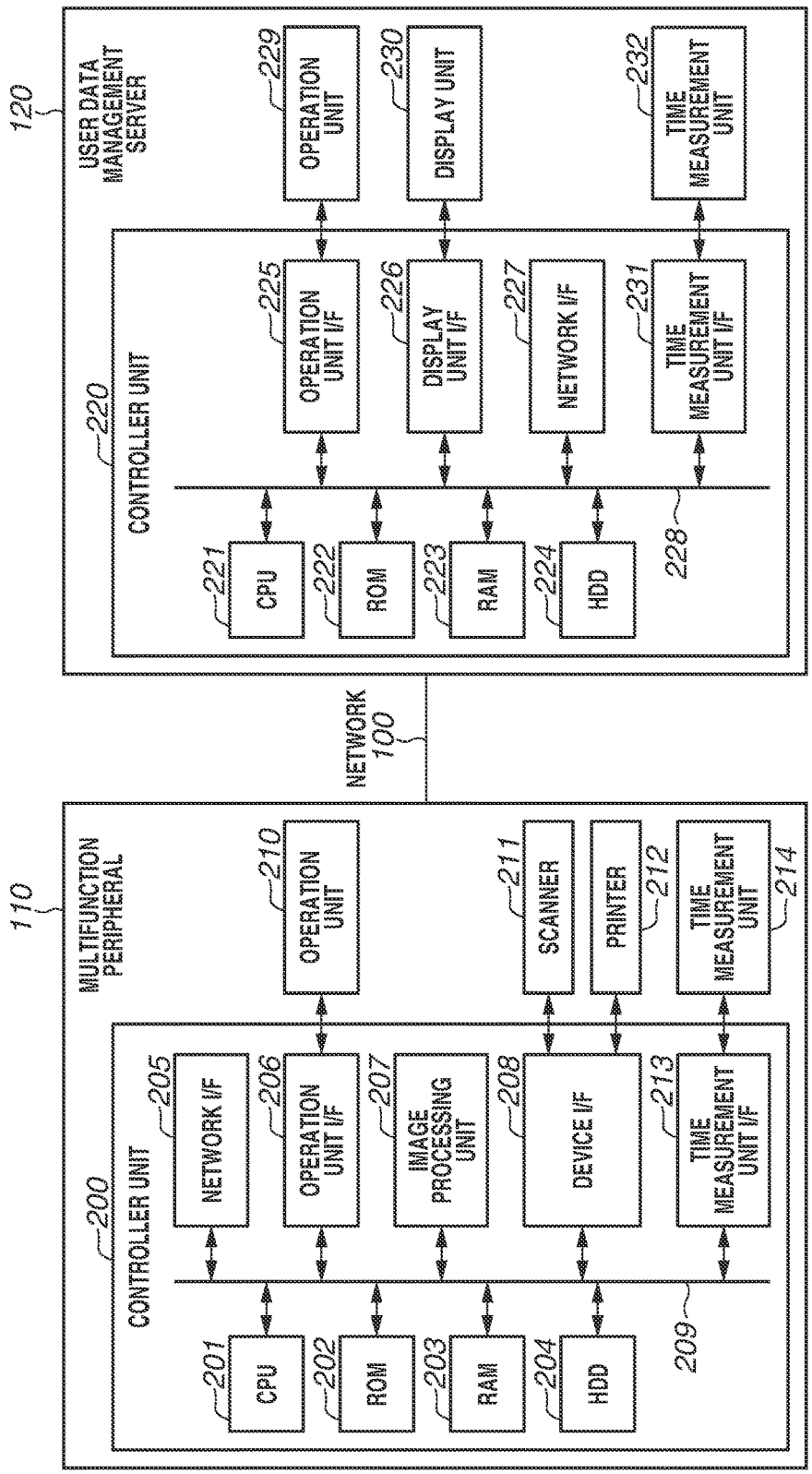

FIG. 2 is a block diagram illustrating respective configurations of a multifunction peripheral and a server according to the first exemplary embodiment.

Figure 3:
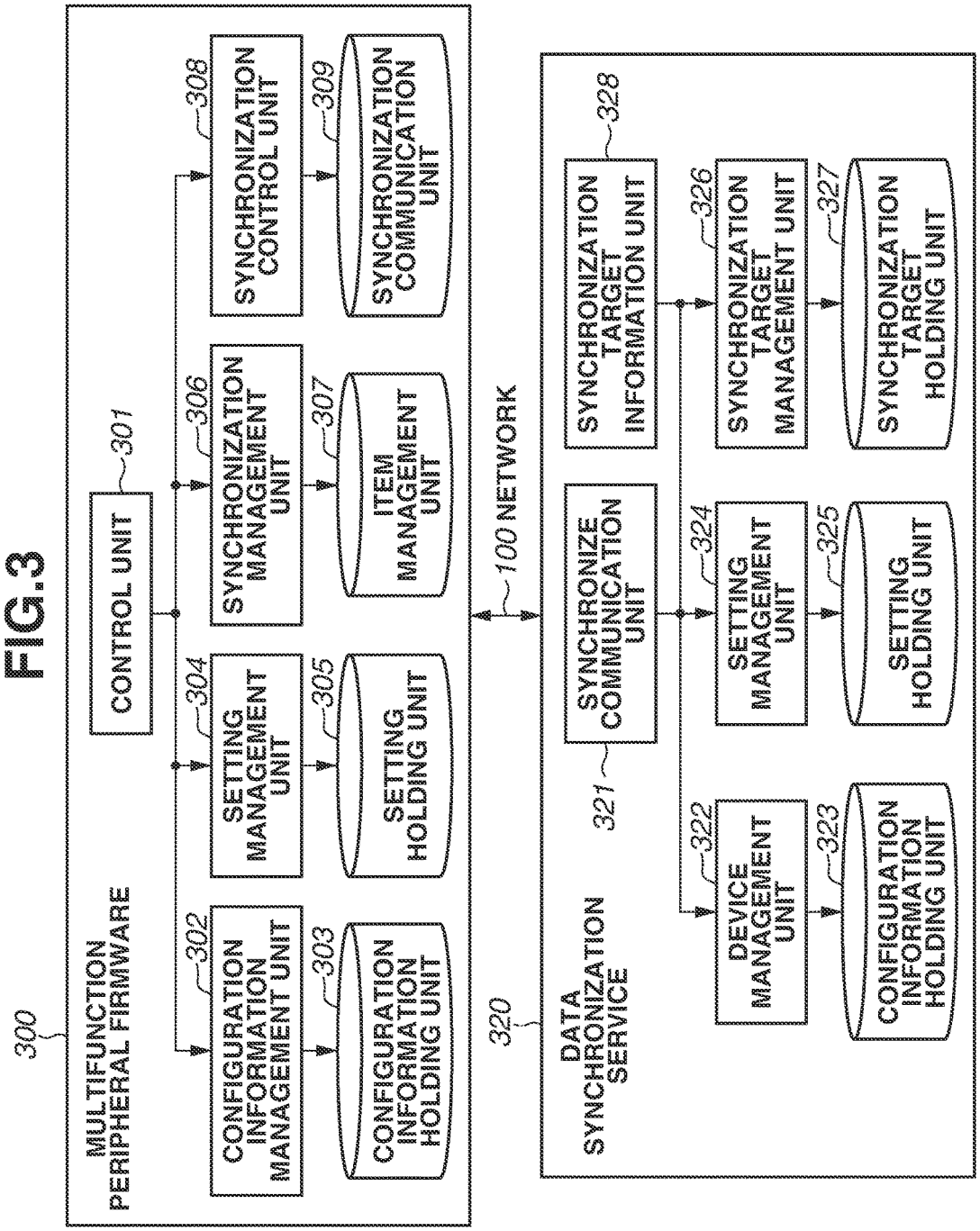

FIG. 3 is a block diagram illustrating respective software configurations of the multifunction peripheral and the server according to the first exemplary embodiment.

Figure 4:
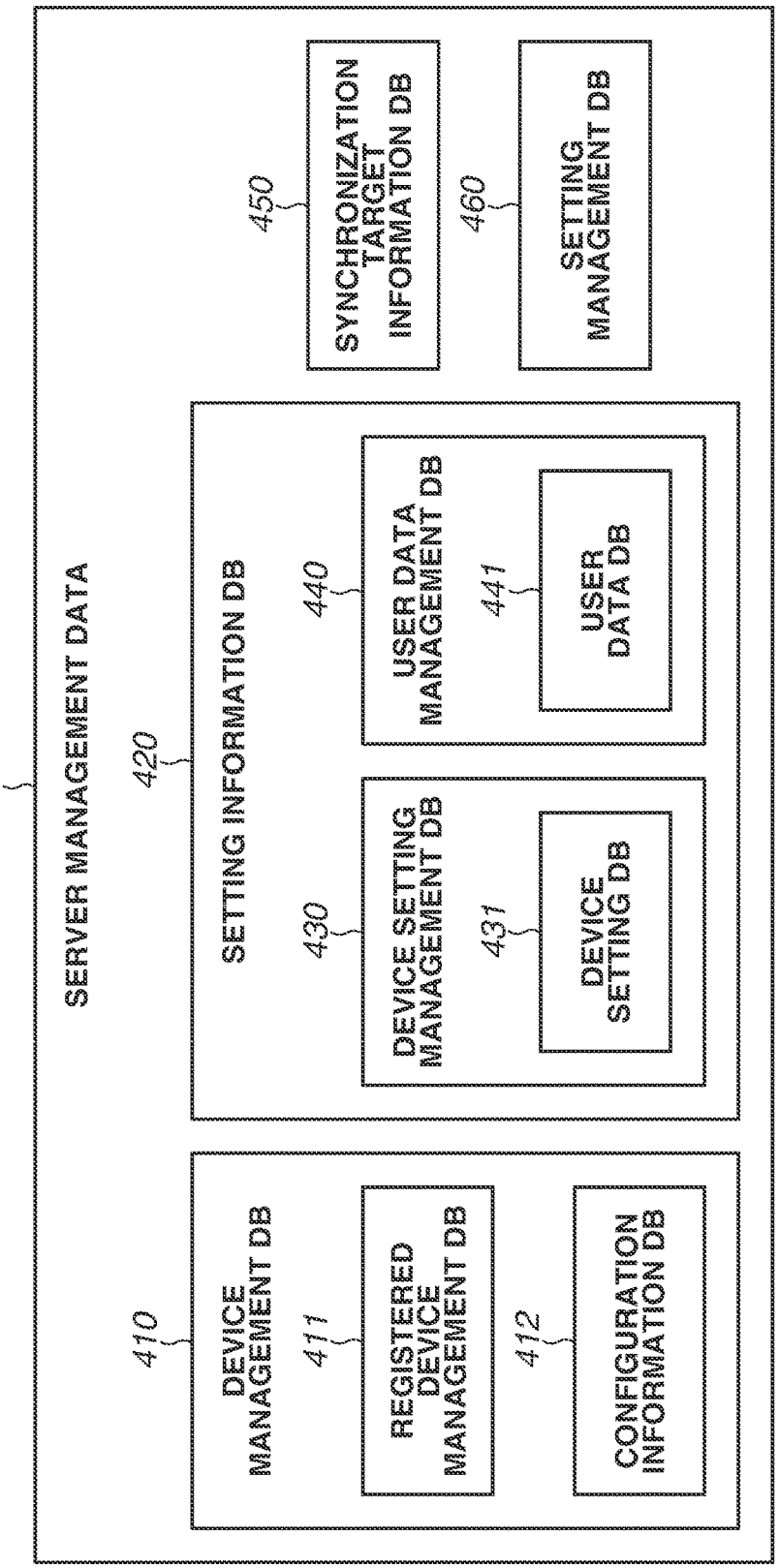

FIG. 4 is a block diagram illustrating a structure of data managed by the server according to the first exemplary embodiment.

Figure 5:
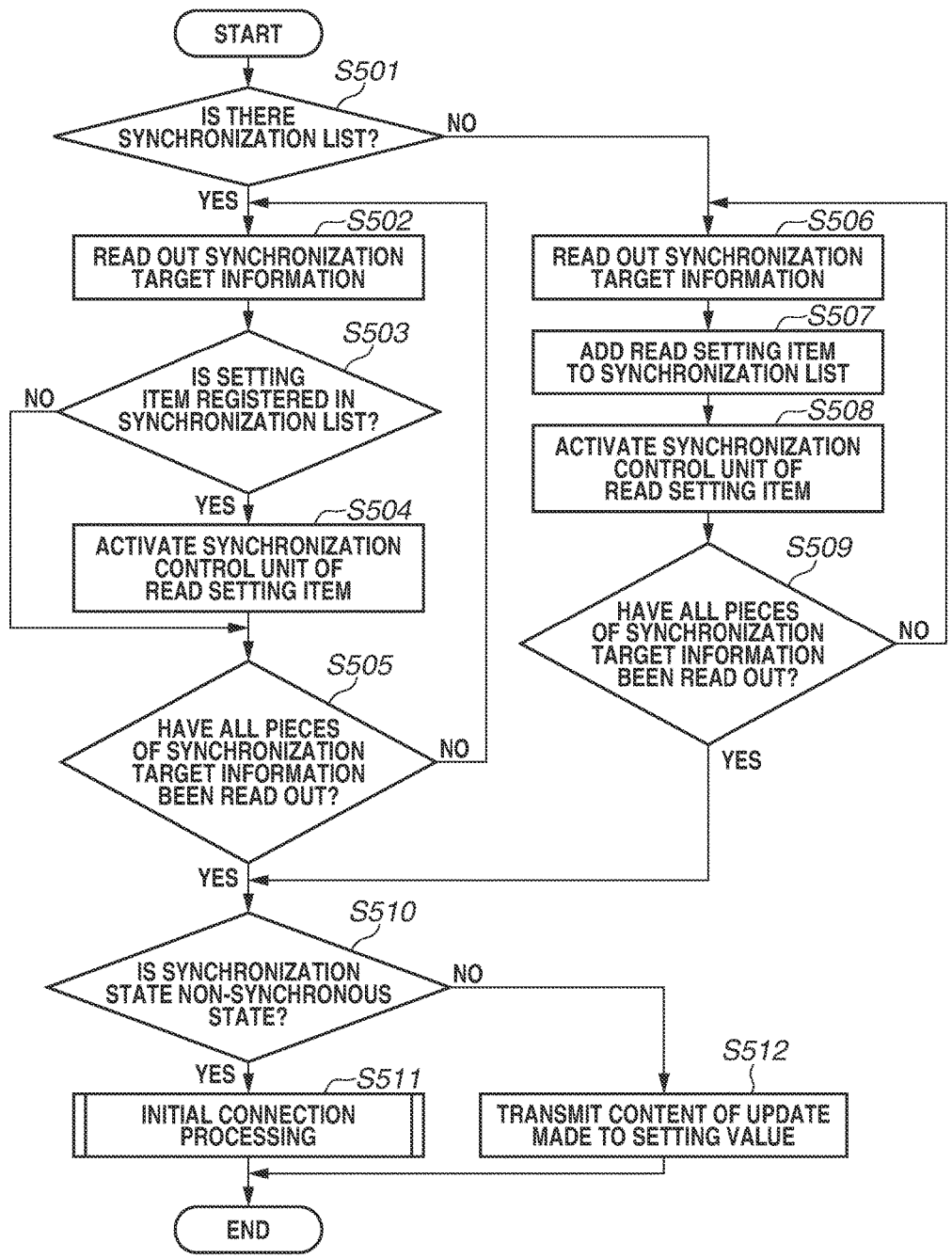

FIG. 5 is a flowchart illustrating processing in which the multifunction peripheral determines a setting item to be synchronized according to the first exemplary embodiment.

FIG. 6 is a flowchart illustrating initial connection processing performed by the multifunction peripheral according to the first exemplary embodiment.

FIGS. 7A and 7B are flowcharts illustrating synchronization processing at the time of an initial connection according to the first exemplary embodiment.

Figure 8:
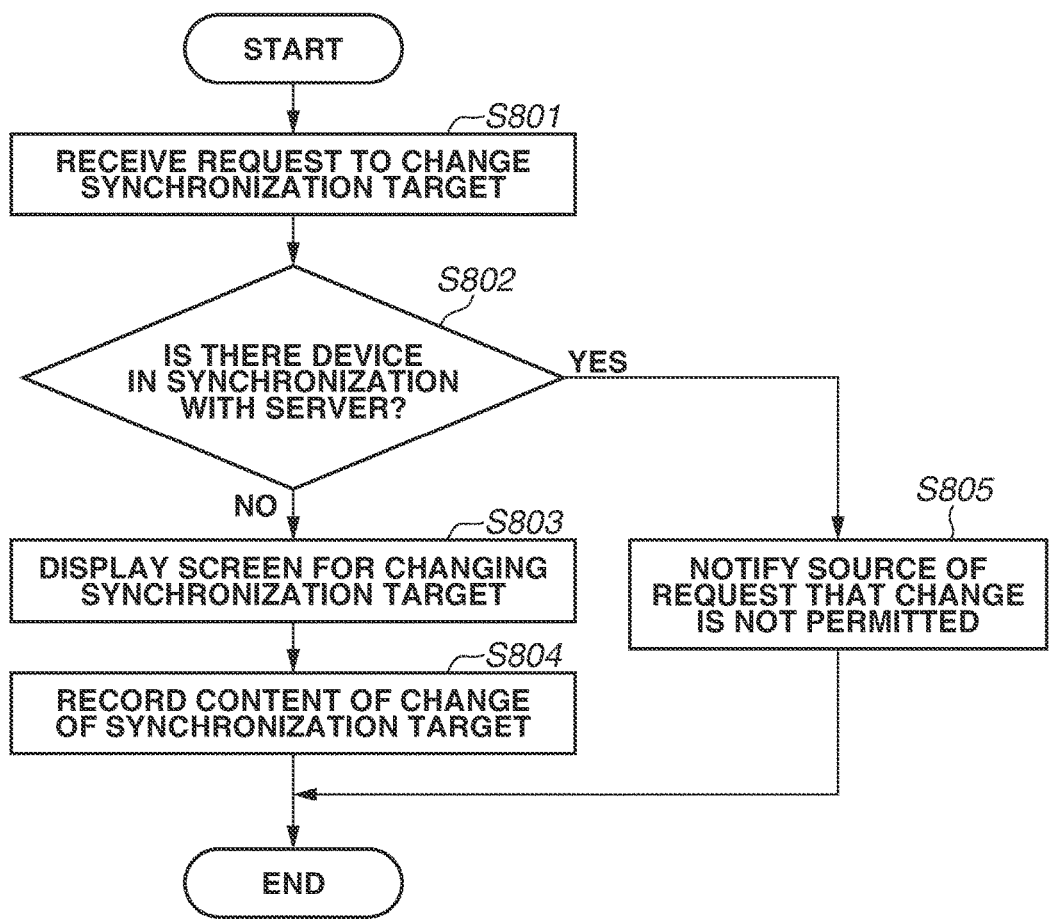

FIG. 8 is a flowchart illustrating processing in which the server sets the setting item to be handled as a synchronization target according to the first exemplary embodiment.

FIGS. 9A and 9B each illustrate an example of a notification displayed on a display unit of the server according to the first exemplary embodiment.

Figure 10:
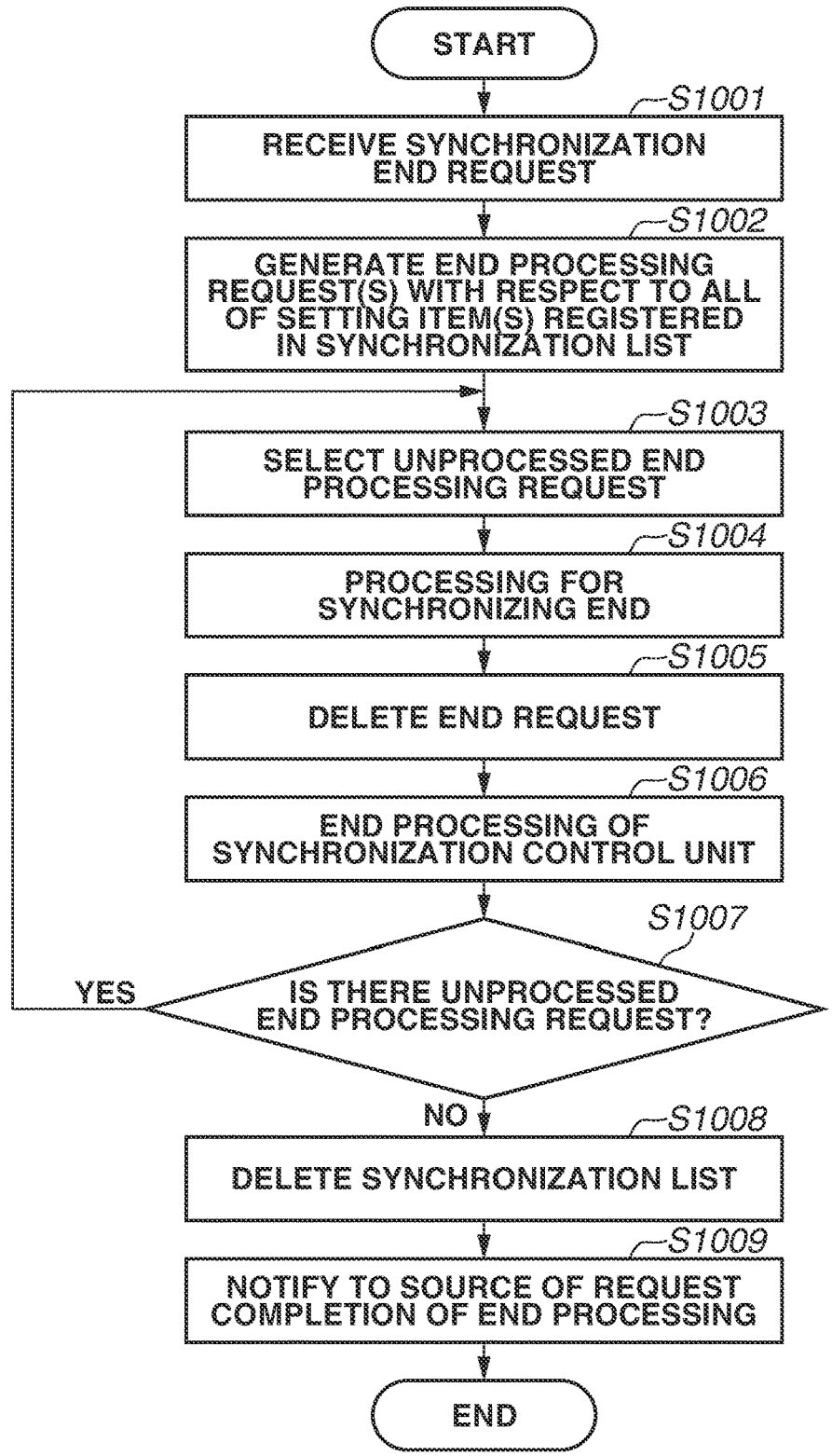

FIG. 10 is a flowchart illustrating processing for ending synchronization that is performed by the multifunction peripheral according to a second exemplary embodiment.

FIGS. 11A and 11B are flowcharts illustrating synchronization ending processing in the multifunction peripheral according to the second exemplary embodiment.

FIG. 12 is a flowchart illustrating initial connection processing performed by the multifunction peripheral according to a third exemplary embodiment.

Figure 13A:
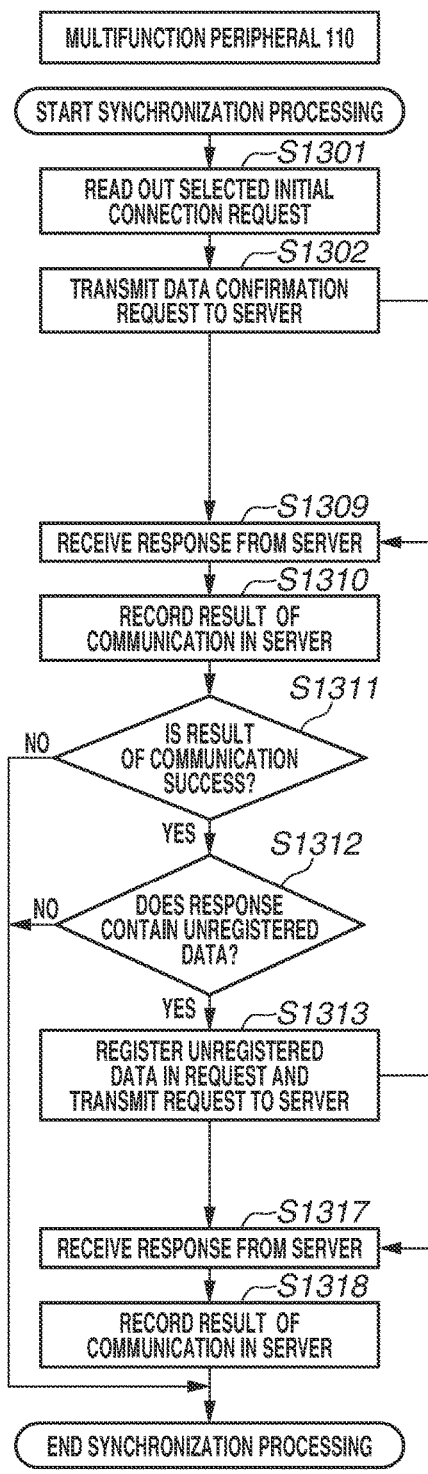
Figure 13B:
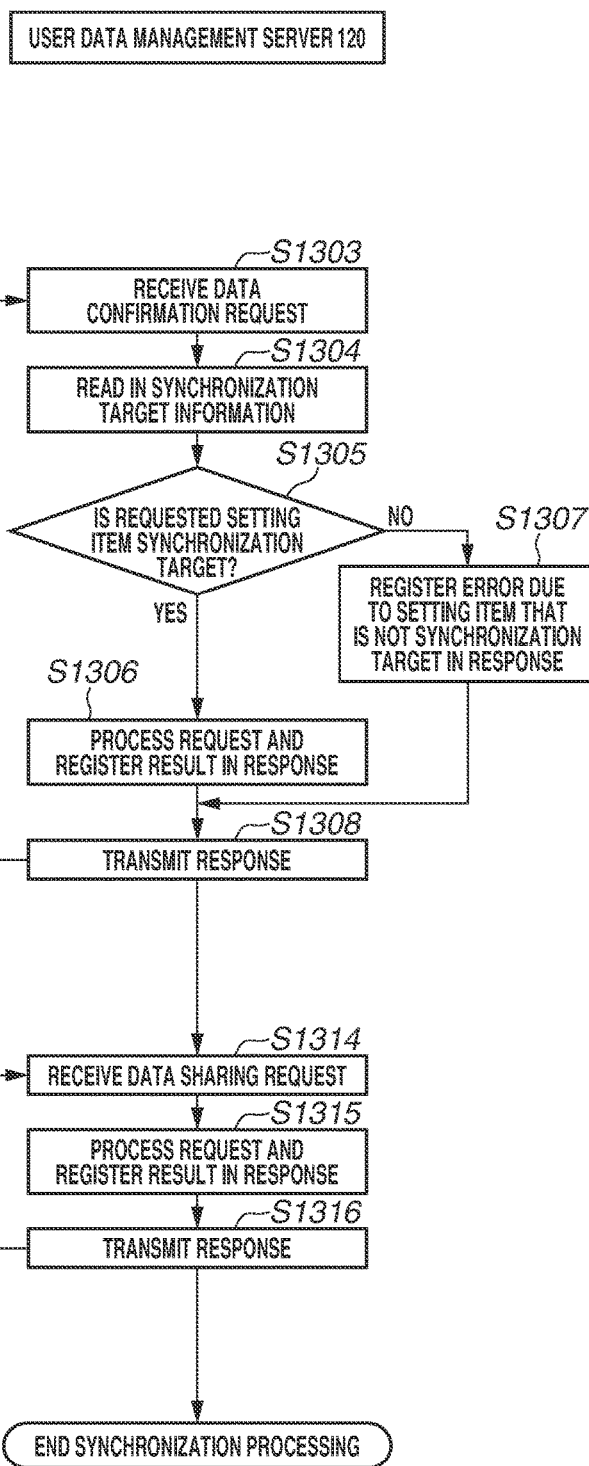

FIGS. 13A and 13B are flowcharts illustrating synchronization processing at the time of the initial connection for shared data in the multifunction peripheral according to the third exemplary embodiment.

FIGS. 14A and 14B are flowcharts illustrating initial connection processing in the multifunction peripheral according to a fourth exemplary embodiment.

DESCRIPTION OF THE EMBODIMENTS

In the following description, exemplary embodiments for embodying the present invention will be described with reference to the drawings. The exemplary embodiments will be described with use of a multifunction peripheral as one example of an image forming apparatus. However, the exemplary embodiments that will be described below do not limit the present invention defined according to the claims, and further, not all of combinations of features that will be described in the exemplary embodiments are necessarily essential to a solution of the invention.

In an information sharing system (an information processing system) according to a first exemplary embodiment of the present invention, setting information is shared between a server and a client. The setting information in the present exemplary embodiment includes configuration information, device setting information, user data, user device settings, simple user settings, and a user address book. Details of each information will be described in detail below with reference to tables 2 to 7.

The information sharing system according to the present exemplary embodiment causes the server and the client to share the setting information held by the server and the setting information held by the client therebetween every time a predetermined timing arrives. In this manner, when the setting information held by one of the server and the client is changed as time passes, the information sharing system according to the present exemplary embodiment allows the changed setting information to be shared with the other side. Hereinafter, processing for sharing information between the server and the client will be referred to as synchronization processing.

Further, in the information sharing system according to the present exemplary embodiment, the setting information is shared between or among a plurality of clients connected to the server. The server shares a content of the setting information with a first client, and also shares the information with a second client. In this manner, the first client and the second client share common setting information.

In the information sharing system according to the present exemplary embodiment, when the client is connected to the server for the first time, the client transmits all setting information that the client handles as synchronization targets to the server. The server returns an error response in response to the transmission of a setting item which the server does not handle as the synchronization target of the setting information transmitted from the client. In the present exemplary embodiment, even when the setting item is updated in the client, the error response serves as a notification which prohibits the client from notifying the server of a content of the update with respect to the setting item as to which the error response has been returned. In the following description, a term "connect" might mean to enable a plurality of apparatuses to communicate each other electronically or might mean to wire the plurality of apparatuses physically via one or more network lines. Enabling a plurality of apparatus to communicate each other electronically includes, for example, enabling a server and a client to perform synchronization communication by sending a request from a client to a server to start synchronization processing of setting items in accordance with a user operation on a client.

After that, the client apparatus does not notify the server of the content of the update with respect to the setting information of the setting item as to which the error response has been returned at the time of connection to the server for the first time. On the other hand, with respect to the setting information of the setting item as to which a normal response has been returned at the time of the connection to the server for the first time, in a case where the setting information of the setting item is updated after the connection to the server, the client apparatus notifies the server of the content of the update.

Thus, the client is prevented from notifying the content of the update to the server when the setting item is updated with respect to the setting information regarding the setting item that the server does not handle as the synchronization target. Therefore, a load of data processing and communication on the system can be reduced during the synchronization processing.

In the present exemplary embodiment, the server is an information processing apparatus, such as a personal computer (PC). The client can be the image forming apparatus, such as the multifunction peripheral. In the following description, the present exemplary embodiment will be described based on the example in which the client is the multifunction peripheral.

A configuration of the information sharing system according to the present exemplary embodiment will be described with reference to FIG. 1. A multifunction peripheral 110 and a server 120 are connected to a network 100.

The multifunction peripheral 110 is an apparatus that realizes a plurality of functions, such as a copy function and a facsimile (FAX) function, and stores therein setting information to be used to perform these functions. When login of a user is received, the multifunction peripheral 110 according to the present exemplary embodiment can use settings for the logging-in user.

The server 120 centrally manages user setting information of the multifunction peripheral 110 and a multifunction peripheral 111. This management allows the user to use the same user settings regardless of a multifunction peripheral which the user logs in to.

FIG. 2 is a block diagram illustrating configurations of the multifunction peripheral 110 and the server 120 according to the present exemplary embodiment. First, the configuration of the multifunction peripheral 110 will be described.

A controller unit 200 includes a central processing unit (CPU) 201. The CPU 201 activates an operating system (OS) with use of a boot program stored in a read only memory (ROM) 202. The CPU 201 executes an application program stored in a hard disk drive (HDD) 204 on this OS, and performs various kinds of processing by this execution.

A random access memory (RAM) 203 is used as a work area of this CPU 201. Further, the RAM 203 provides an image memory area for temporarily storing image data in addition to providing the work area.

The HDD 204 stores the above-described application program and image data, and various types of setting information. The HDD 204 holds the setting information regarding settings of the multifunction peripheral 110. A method for managing the setting information in the multifunction peripheral 110 will be described below.

An operation unit interface (I/F) 206, a device I/F 208, a network I/F 205, and an image processing unit 207 are connected to the CPU 201 via a system bus 209, in addition to the ROM 202 and the RAM 203.

The operation unit I/F 206 is an interface to an operation unit 210 including a touch panel, and outputs image data that is displayed on the operation unit 210 to the operation unit 210. Further, the operation unit I/F 206 transfers information input by the user via the operation unit 210 to the CPU 201.

A scanner 211 and a printer 212 are connected to the device I/F 208. The device I/F 208 carries out a synchronous/asynchronous conversion of the image data. The network I/F 205 is connected to the network 100, and inputs and outputs information between the multifunction peripheral 100 and each device in the network 100 via the network 100. The image processing unit 207 performs processing such as processing of an image input from the scanner 211, processing of an image to be output to the printer 212, an image rotation, an image compression, a resolution conversion, a color space conversion, and a tone conversion.

A time measurement unit 214 is connected to a time measurement unit I/F 213. The time measurement unit 214 measures the time. For example, a real time clock (RTC) can be used as the time measurement unit 214.

The multifunction peripheral 110 includes the controller unit 200, the operation unit 210, the scanner 211, and the printer 212. The operation unit 210 is connected to the controller unit 200, and the scanner 211, which is an image input device, and the printer 212, which is an image output device, are also connected to the controller unit 200.

Next, the configuration of the server 120 will be described. The server 120 includes a controller unit 220, an operation unit 229, and a display unit 230.

The controller unit 220 includes a CPU 221. The CPU 221 activates an OS with use of a boot program stored in a ROM 222.

The CPU 221 executes an application program stored in an HDD 224 on this OS, and performs various kinds of processing by such execution. A RAM 223 is used as a work area of this CPU 221.

The HDD 224 stores the above-described application program, virtual device settings indicating the setting information of the multifunction peripheral 110, and the like. Details of a method for managing the virtual device settings will be described below.

An operation unit I/F 225, a display unit I/F 226, and a network I/F 227 are connected to the CPU 221 via a system bus 228 in addition to the ROM 222 and the RAM 223. The operation unit I/F 225 is an interface to the operation unit 229 including a mouse, a keyboard, a touch panel, or the like, and transfers information input by a user via the operation unit 229 to the CPU 221.

The display unit I/F 226 outputs image data that is displayed on the display unit 230 including a display, to the display unit 230. Further, the network I/F 227 is connected to the network 100, and inputs and outputs information between the server 120 and each device in the network 100 via the network 100.

A time measurement unit 232 is connected to a time measurement unit I/F 231. The time measurement unit 232 measures the time. For example, the RTC can be used as the time measurement unit 232.

Next, one example of software configurations according to the present exemplary embodiment will be described with reference to FIG. 3. First, a configuration of multifunction peripheral firmware 300 provided in the multifunction peripheral 110 will be described.

A control unit 301 controls a timing of synchronizing the setting information between the multifunction peripheral 110 and the server 120, and a content to be synchronized. The control unit 301 performs control on transmitting all setting information that the multifunction peripheral 110 manages as the synchronization targets to the server 120 when the multifunction peripheral 110 is connected to the server 120 for the first time, as will be described below with reference to FIG. 5. Further, the control unit 301 controls execution of update synchronization (first synchronization processing), in which the server 120 is notified of a content of an update made to the setting information in the multifunction peripheral 110 after the multifunction peripheral 110 is connected to the server 120.

In this manner, when the multifunction peripheral 110 is connected to the server 120, the multifunction peripheral 110 transmits the setting information held in the HDD 204 to the server 120. Further, when the setting information held in the HDD 204 is updated after the multifunction peripheral 110 is connected to the server 120, the multifunction peripheral 110 transmits information indicating the content of the update made to this setting information to the server 120.

In the present exemplary embodiment, the content of the update that the server 120 is notified of from the multifunction peripheral 110 is a current content of the setting item in which a comparison is made and a difference exists between the data recorded in the server 120 when the multifunction peripheral 110 has notified the server 120 last time, and the data currently held by the multifunction peripheral 110. In this manner, the multifunction peripheral 110 compares first setting information previously shared with the server 120 and second setting information currently held by the multifunction peripheral 110, and transmits the setting information of the setting item in which there is the difference, to the server 120 as the content of the update.

Further, the control unit 301 controls execution of acquisition synchronization (second synchronization processing). In the second synchronization processing, a content of an update made to the setting information in the server 120 is acquired and the acquired content is reflected in the multifunction peripheral 110. In the present exemplary embodiment, the content of the update that the multifunction peripheral 110 is notified of from the server 120 is a current content of the setting item in which a comparison is made and a difference exists between the data recorded in the multifunction peripheral 110 when the server 120 has notified the multifunction peripheral 110 last time, and the data currently held by the server 120.

The control unit 301 determines the timing at which the setting information should be synchronized between the server 120 and the multifunction peripheral 110. Further, the control unit 301 determines whether the acquisition synchronization or the update synchronization is carried out. The control unit 301 confirms with a synchronization management unit 306 described below whether the setting item determined to be synchronized is the synchronization target, and makes a notification to a synchronization control unit 308 if the setting item is the synchronization target.

The control unit 301 calls up the synchronization control unit 308 every time a predetermined time period has elapsed, at a timing when a synchronization request is received, and at a timing when a device operation occurs (when the user logs in/out, when the multifunction peripheral 110 is started up, when the multifunction peripheral 110 transitions to a sleep mode, when the multifunction peripheral 110 wakes up from the sleep mode, and the like). For example, the control unit 301 performs the following control. The control unit 301 requests a configuration information management unit 302 to update the configuration information when the multifunction peripheral 110 is started up, and requests the synchronization control unit 308 to synchronize the configuration information after that. Then, the control unit 301 regularly requests the synchronization control unit 308 to synchronize the content of the update made to the data after the multifunction peripheral 110 is started up.

Further, the control unit 301 controls a start of the synchronization and an end of the synchronization between the multifunction peripheral 110 and the server 120. The control unit 301 starts the synchronization and ends the synchronization upon, for example, receiving an instruction from a not-illustrated operation unit. If an instruction to start the synchronization with the multifunction peripheral 110 is received in an out of synchronization state with the server 120, the control unit 301 performs processing for starting the synchronization. If an instruction to end the synchronization with the multifunction peripheral 110 is received in a synchronization state with the server 120, the control unit 301 performs processing for ending the synchronization.

The configuration information management unit 302 manages the configuration information of the multifunction peripheral 110. The configuration information management unit 302 stores the configuration information acquired from the multifunction peripheral 110 in a configuration information holding unit 303. The acquired configuration information includes a model code for identifying a model, a version of the firmware 300, an accessory configuration, and a software license. The configuration information management unit 302 collects new information when the information included in the configuration information is updated. Then, the configuration information management unit 302 instructs the configuration information holding unit 303 to store the collected configuration information. This configuration information is information structured in a system similar to configuration information stored in a configuration information database (DB) 412, which will be described below.

The configuration information holding unit 303 receives the instruction from the configuration information management unit 302 and stores the configuration information in the RAM 203 or the HDD 204, thereby holding the configuration information. The configuration information holding unit 303 receives the instruction from the configuration information management unit 302, and updates the configuration information and reads out the configuration information.

A setting management unit 304 manages acquisition and an update of the setting information other than the configuration information to be used within the multifunction peripheral 110. When a request to acquire the setting information is received, the setting management unit 304 acquires the corresponding setting information from a setting holding unit 305, and returns the acquired setting information. When a request to change the setting information is received, the setting management unit 304 updates the corresponding setting information in the setting holding unit 305, and notifies the control unit 301 of the occurrence of the update to the setting information and the content of the updated setting information.

The setting holding unit 305 is a unit that holds the setting information other than the configuration information to be used in the multifunction peripheral 110 in the HDD 204, which is a storage unit. The multifunction peripheral 110 reads out the setting information held by the setting holding unit 305 via the setting management unit 304, and switches a behavior of an operation based on this read setting information. Examples of data of various items included in the setting information will be described below with reference to the tables.

In this manner, the configuration information management unit 302 and the setting management unit 304 manage the setting information (including the configuration information) regarding the settings of the multifunction peripheral 110.

The synchronization management unit 306 manages the setting item to be synchronized between the multifunction peripheral 110 and the server 120. The synchronization management unit 306 manages the setting item set as the target to be synchronized of the setting information managed by the setting management unit 304 in the multifunction peripheral 110 as synchronization target information. This synchronization target information is permission information indicating the setting item of the setting information that the multifunction peripheral 110 is permitted to share with the server 120. In other words, the synchronization target information is information indicating the setting item of the setting information that the multifunction peripheral 110 handles as the synchronization target with the server 120. The setting item that the multifunction peripheral 110 handles as the synchronization target with the server 120 varies depending on the model of the multifunction peripheral 110, the version of the firmware 300 of the multifunction peripheral 110, and the like. For example, the multifunction peripheral 110 can handle the device settings and the user data as the synchronization targets. Further, the multifunction peripheral 110 can handle the address book information as the synchronization target in addition to the device settings and the user data.

The synchronization target information is stored in the HDD 204. When the multifunction peripheral 110 starts the synchronization with the server 120, the synchronization management unit 306 acquires the setting item included in the setting information held by the multifunction peripheral 110 and generates the synchronization target information. Further, when a request to change the synchronization target data is received after the synchronization of the data is started, the synchronization management unit 306 updates the synchronization target information according to a received content of the change. Processing for updating the synchronization target information will be described in detail with reference to FIG. 5.

An item management unit 307 manages the setting item of the setting information held by the multifunction peripheral 110. When the data is synchronized between the multifunction peripheral 110 and the server 120, the synchronization processing is performed for each setting item managed by the item management unit 307.

The synchronization control unit 308 processes the synchronization request received from the control unit 301. The synchronization control unit 308 processes the received synchronization request for each setting item. When the update synchronization is received, the synchronization control unit 308 determines the data and the setting item to be synchronized, and requests the synchronization communication unit 309 to carry out communication for the update synchronization. Then, upon receiving a result of the communication from the synchronization communication unit 309, the synchronization control unit 308 notifies it to the control unit 301 as a result of the synchronization. When the acquisition synchronization is received, the synchronization control unit 308 acquires a last update time of the setting item to be synchronized, and requests the synchronization communication unit 309 to carry out communication for the update synchronization. Then, upon receiving a result of the communication from the synchronization communication unit 309, the synchronization control unit 308 notifies the setting management unit 304 of the content of the update to reflect the acquired content. Then, upon receiving a result of the update made to the data by the setting management unit 304, the synchronization control unit 308 notifies it to the control unit 301 as a result of the synchronization.

The synchronization communication unit 309 carries out communications of information for the data synchronization between the multifunction peripheral 110 and the server 120. The synchronization communication unit 309 receives the request for the synchronization communication from the synchronization control unit 308. When the acquisition synchronization is received, the synchronization communication unit 309 transmits a request for the content of the update made after the last update time, to the server 120, notifying the server 120 of the last update time of the data of the setting item to be synchronized. Then, the synchronization communication unit 309 receives a response from the server 120, and notifies the synchronization control unit 308 of a response content contained in the response, as a notification of the result of the synchronization.

When the update synchronization is received, the synchronization communication unit 309 acquires the data of the setting item to be updated, adds time that the data has been updated, and transmits a request to the server 120. Then, the synchronization communication unit 309 receives a response from the server 120, and notifies the synchronization control unit 308 of a response content contained in the response as a notification of the result of the synchronization.

Next, a configuration of a data synchronization service 320 included in the server 120 will be described. The data synchronization service 320 is a service that provides a function of managing the setting information of the multifunction peripheral 110. In the present exemplary embodiment, the data synchronization service 320 will be described, referring to the example in which this service is provided by the server 120. FIG. 2 illustrates a configuration in which the server 120 and the multifunction peripheral 110 are connected to each other, but the configuration is not limited thereto. For example, the data synchronization service 320 may be provided by the multifunction peripheral 110, and another multifunction peripheral 110 may be connected to this multifunction peripheral 110. In other words, the information sharing system may be configured in such a manner that one multifunction peripheral of the plurality of multifunction peripherals functions as the server.

A synchronization communication unit 321 receives the synchronization communication request from the multifunction peripheral 110, performs the synchronization processing, and transmits the synchronization communication response to the multifunction peripheral 110.

When the multifunction peripheral 110 is connected to the server 120, the synchronization communication unit 321 receives the setting information held by the multifunction peripheral 110 from the multifunction peripheral 110. Further, when the setting information held by the multifunction peripheral 110 is updated after the multifunction peripheral 110 is connected to the server 120, the synchronization communication unit 321 receives the information indicating the content of the update made to this setting information from the multifunction peripheral 110. The setting information of the multifunction peripheral 110 and the information indicating the content of the update are information received by the network I/F 227.

If the synchronization communication request is a request regarding the configuration information, the synchronization communication unit 321 notifies a device management unit 322 of a content of the received request. If the synchronization communication request is the data synchronization request, the synchronization communication unit 321 acquires information indicating a setting item which is requested for the synchronization communication, and confirms with a synchronization target management unit 326 whether this setting item is the synchronization target. If the setting item is not the synchronization target, the synchronization communication unit 321 transmits a notification indicating that the setting item is not the synchronization target as the response. If the setting item is the synchronization target, the synchronization communication unit 321 notifies a setting management unit 324 of the synchronization request, and makes a request for the synchronization processing to the setting management unit 324. Then, the synchronization communication unit 321 receives a result of the synchronization processing from the setting management unit 324, and transmits the response to the multifunction peripheral 110. Further, the synchronization communication unit 321 receives information indicating a response to the content of the request for the communication from each management unit, and carries out a communication of the response to the multifunction peripheral 110, which is a request source.

A device management unit 322 manages the configuration information of the multifunction peripheral 110 connected to the data synchronization service 320. The device management unit 322 receives the configuration information of the multifunction peripheral 110 requesting the synchronization of the data, and updates a configuration information holding unit 323. Further, the device management unit 322 receives confirmation about whether the multifunction peripheral 110 that has issued the synchronization request has already started the synchronization. Then, the device management unit 322 determines whether the configuration information holding unit 323 contains the configuration information of the corresponding multifunction peripheral 110 that is contained in the received synchronization request.

If the request received by the device management unit 322 is a request from the multifunction peripheral 110 newly connected to the data synchronization service 320, the device management unit 322 newly records the configuration information in the configuration information holding unit 323. If the received request is a request from the multifunction peripheral 110 with which the synchronization has been already carried out and for which the configuration information has been already recorded in the configuration information holding unit 323, the device management unit 322 requests the configuration information holding unit 323 to update the configuration information with the received data. If a request to end the use of the data synchronization service 320 is received, the device management unit 322 requests the configuration information holding unit 323 to delete the configuration information of the multifunction peripheral 110 that has issued the request.

The configuration information holding unit 323 holds a configuration information management DB, which manages the configuration information of the multifunction peripheral 110 connected to the data synchronization service 320. The configuration information holding unit 323 receives the request to acquire the configuration information and the request to update the configuration information, and updates the configuration information management DB. When the configuration information management DB is updated, the configuration information holding unit 323 records the last update time together with the content of the update.

The setting management unit 324 manages a setting information management DB, which is held by the setting holding unit 325. When the request for the acquisition synchronization is received from the synchronization communication unit 321, the setting management unit 324 acquires the update data from the setting holding unit 325 by specifying the setting item and time from the last update time on that are contained in the request, and returns the acquired update data to the synchronization communication unit 321. When the update request is received, the setting management unit 324 requests the setting holding unit 325 to update the data by specifying the setting item, the update data, and the update time contained in the request, and returns a result thereof to the synchronization communication unit 321.

The setting holding unit 325 holds the setting information management DB. The setting information is structured so as to be classified by the setting item in the setting information management DB. The setting holding unit 325 receives the request to acquire the setting information and the request to update the setting information for each setting item, and updates the setting information management DB. The setting holding unit 325 updates the setting information management DB, receiving data specifying the update time together with the setting item and the content of the update data. Further, by receiving the data specifying the setting item and the time, the setting holding unit 325 acquires and returns the data updated from the specified time on, of the data of the specified setting item. The details of the data held in the data management DB will be described below.

The synchronization target management unit 326 manages the setting item that the data synchronization service 320 handles as the synchronization target. The synchronization target management unit 326 receives an inquiry specifying the setting item whether it is the synchronization target, from the synchronization communication unit 321, acquires a setting state from a synchronization target holding unit 327, and returns a response indicating whether or not the setting item is the synchronization target. Further, the synchronization target management unit 326 receives a change of the synchronization target information, and changes a setting about whether or not each setting item is the synchronization target. When the setting of the synchronization target is changed, the synchronization target management unit 326 confirms with the device management unit 322 whether there is the multifunction peripheral 110 being in synchronization with the data synchronization service 320. Then, the synchronization target management unit 326 and notifies that it accepts the change to the setting if there is not the multifunction peripheral 110 being in synchronization, and the setting cannot be changed if there is the multifunction peripheral 110 being in synchronization.

The synchronization target holding unit 327 holds a synchronization target information DB, which records the setting item that the data synchronization service 320 handles as the synchronization target. A synchronization target information DB 450 records the setting item and whether or not this setting item is the synchronization target. The synchronization target holding unit 327 accepts the update and the acquisition of the content about the synchronization target or the non-synchronization target.

The communication performed by the above-described firmware is carried out by the network I/F 205 of the multifunction peripheral 110 and the network I/F 227 of the server 120 via the network 100.

FIG. 4 is a block diagram illustrating a structure of the data managed by the data synchronization service 320 according to the present exemplary embodiment.

Server management data 400 includes a device management DB 410, a setting information DB 420, the synchronization target information DB 450, and a setting management DB 460. The device management DB 410 includes a registered device management DB 411 and the configuration information DB 412. The configuration information DB 412 is associated with the multifunction peripheral 110 connected to the data synchronization service 320, and records one piece of data per apparatus. The setting information DB 420 includes the setting information of each setting item managed by the data synchronization service 320. In the present exemplary embodiment, the setting information DB 420 will be described, referring to an example in which the setting information DB 420 includes a device setting management DB 430 and a user data management DB 440.

The device setting management DB 430 includes a device setting DB 431 corresponding to the multifunction peripheral 110 connected to the data synchronization service 320. The device setting DB 431 is a DB that records the device settings structured in a manner similar to the device settings in the multifunction peripheral 110 to allow them to synchronize with the device settings recorded in the multifunction peripheral 110.

The user data management DB 440 includes a user data DB 441, which is the settings of the user using the multifunction peripheral 110 connected to the data synchronization service 320. The user data DB 441 includes the user data for each user, which is the settings applicable only to the relevant user. The user data includes the information indicating the device settings for setting a display and an environment, the simple settings for reading out settings of operations of the copy function and the FAX function, and the address book in which a destination of transmission of the FAX or the like is registered.

The synchronization target information DB 450 records the setting of the setting item that can be synchronized by the data synchronization service 320. In other words, the synchronization target information DB 450 stores shared information indicating the setting item of the setting information that the server 120 is permitted to share with the multifunction peripheral 110.

The setting management DB 460 is a database that stores metadata regarding each of the settings managed by the data synchronization service 320. An example of the data stored in each of the DBs will be described below.

A table 1 indicates device identification information stored in the registered device management DB 411. The registered device management DB 411 is a database that manages the individual multifunction peripheral 110 with which the data is synchronized by the server 120. The registered device management DB 411 stores a device identification (ID) for uniquely identifying the multifunction peripheral 110 with which the data is synchronized, an individual identifier for identifying the individual multifunction peripheral 110, and the like.

TABLE 1

Table Indicating Registered Device Management DB

| Device ID | Individual Identifier |
| --- | --- |
| 100001 | A1-AAAA |
| 100002 | A1-AAAB |
| 100003 | B1-AAAA |
| 100004 | B2-AAAA |
| 100005 | C1-AAAA |

The tables 2 to 7 indicate the content of the setting information held by the server 120. In the present exemplary embodiment, the setting information includes the configuration information, the device setting information, the user data, the user device settings, the user simple settings, and the information in the user address book.

The table 2 indicates the content of the configuration information managed in the configuration information DB 412. The configuration information is information indicating the function executable by and the setting information settable in each multifunction peripheral.

The configuration information DB 412 is the database that stores and manages the configuration information. The configuration information includes the individual identifier for identifying the individual multifunction peripheral 110, a model name, the version of the firmware 300, the license information indicating the usable function, and a synchronization operation state indicating whether the individual is in synchronization or is temporarily suspending. Further, the configuration information includes information indicating, for example, whether the individual is equipped with a finisher and an optional cassette. The model name, the version of the firmware 300, the license, and the like are structured in a similar system to the data stored in the setting management DB 460, which will be described below.

TABLE 2

Table Indicating Items in Configuration Information DB

| Attribute | Value |
| --- | --- |
| Individual Identifier | A1-FFFF |
| Model Name | A |
| Version | V 1.01 |
| License | Transmission |
|  | High Compression |
|  | Synchronization of Setting Value |
| Accessory | Finisher 1 |
|  | Optional Cassette |
| Operation State | In Synchronization |

The table 3 indicates the content of the device setting information managed in the device setting DB 431. In the present exemplary embodiment, the device setting DB 431 is the database that stores the device setting information used in the multifunction peripheral 110. The setting information stored in the device setting DB 431 includes elements such as a setting information identifier for identifying the setting information, a value of the setting information, an initial value, a value range, and a display condition. These elements are structured in a system similar to the device setting information managed in the HDD 204 within the multifunction peripheral 110. When the setting information is changed in the server 120 or the multifunction peripheral 110, the device setting information is synchronized by communicating at least the setting information identifier and the value of the data indicated in the table 3.

TABLE 3

Table Indicating Items in Device Setting DB

| Setting Value Identifier | Value | Update Time | Initial Value | Value Range | Condition |
| --- | --- | --- | --- | --- | --- |
| settings.common.sleep_time | One Minute | April 1, 2013 at 12:05 | Five Minutes | One Minute to Sixty Minutes | — |
| settings.print.density | 6 | April 22, 2014 at 19:49 | 5 | 0 to 10 | — |
| settings.send.compress_ratio | Low | June 21, 2013 at 12:00 | Standard | Low, Standard, and High | Transmission License |

TABLE 3-continued

Table Indicating Items in Device Setting DB

| Setting Value Identifier | Value | Update Time | Initial Value | Value Range | Condition |
|---|---|---|---|---|---|
| settings.print.tray_position | A | April 22, 2014 at 19:49 | Tray A | A, B, and C | Finisher Option (OPT) |
| settings.usb_enable | OFF | April 22, 2014 at 19:49 | ON | OFF and ON | — |
| settings.auth.auth_mode | ON | April 22, 2013 at 19:40 | OFF | OFF and ON | — |
| settings.auth.personalize | ON | April 22, 2013 at 19:40 | OFF | OFF and ON | — |
| settings.auth.initial_screen | OFF | April 22, 2014 at 19:49 | OFF | OFF and ON | — |

Next, the data stored in the user data management DB 440 will be described with reference to the tables 4 to 8. In the present exemplary embodiment, the user data management DB 440 will be described referring to an example that identifies the user information by a username, but an ID or the like may be used instead of the username.

The table 4 indicates the user data contained in the user data DB 441. The user data DB 441 includes the device settings, the simple settings, and the address book identified by the username. The device settings, the simple settings, and the address book will be described with reference to the tables 5 to 7, respectively.

TABLE 4

Table Indicating Items in User Data

| Username | sato |
| Device Settings | sato.configuration |
| Simple Settings | sato.custom |
| Address Book | sato.address |

The table 5 is a table indicating the user device settings contained in the user data DB 441. The items settable for each user include a display language, a screen after a recovery, a screen color, an audio volume, and an audio speed. Each of the items is equivalent of the setting item in the device that is used when the user is not logging in, and is the item to be read out and used as the setting for each user when the user logs in. For each of the setting items, a date and time when the setting information is changed is recorded as the last update time.

TABLE 5

Table Indicating Items in User Device Settings

| Setting Item | Setting Value | Last Update Date and Time |
|---|---|---|
| Display Language | Japanese | January 23, 2014 at 10:40 |
| Screen after Recovery | Main Menu | January 23, 2014 at 10:40 |
| Screen Color | Standard | January 23, 2014 at 10:40 |
| Audio Volume | Standard | January 23, 2014 at 10:40 |
| Audio Speed | Standard | January 23, 2014 at 10:40 |

The table 6 indicates the user simple settings contained in the user data DB 441. The user simple setting function is a function of reading out the setting of each function of the multifunction peripheral 110 and allowing immediate use of the function. The user simple settings each include a name of the simple setting, a category of the function, such as the copy and the FAX, a setting item changeable along with each function and setting information thereof, and the last update time. For example, a simple setting of a No. 2 is a setting of the copy function, and is registered with a name of an energy-saving setting. Further, monochrome as a color setting, 2-in-1 as a multiple-up setting, one-sided to two-sided as an imposition setting, and a copy number of 10 are registered. The last update time is the time when the simple setting is newly generated or changed last time.

TABLE 6

Table Indicating Items in User Simple Settings

| No. | Name | Category of Function | Changeable Setting Item | Setting Value | Last Update Date and Time |
|---|---|---|---|---|---|
| 1 | Black and White | Copy | Color Setting | Monochrome | January 23, 2014 at 10:30 |
| 2 | Energy-saving Setting | Copy | Color Setting | Monochrome | January 23, 2014 at 10:31 |
| | | | Multiple-up Setting | 2-in-1 | |
| | | | Imposition Setting | One-sided to Two-sided | |
| | | | Number of Copies | 10 | |
| 3 | Color | Copy | Color Setting | Full Color | January 23, 2014 at 10:32 |
| | | | Color Option | Vivid | |
| 4 | FAX Regular Format | FAX | Transmission Destination | A Company, CEO | January 23, 2014 at 10:33 |
| 5 | A Company, Mr./Ms. B | SEND | Transmission Destination | A Company, Mr./Ms. B | January 23, 2014 at 10:34 |
| | | | File Format | Portable Document Format (PDF) and High Compression | |

The table 7 is a table indicating the user address book contained in the user data DB 441. A destination of the FAX transmission or a destination of electronic mail (E-mail) transmission can be registered in the address book, and the destination can be read out when the function is used. Individual items in the address book include a setting of category of the E-mail, the FAX, a name of the destination, the transmission destination indicating a mail address or a FAX number of the transmission destination, and the last update date and time.

TABLE 7

Table Indicating Items in User Address Book

| No. | Category | Name | Transmission Destination | Last Update Date and Time |
|---|---|---|---|---|
| 1 | E-mail | A Company, Mr./Ms. B | b@a.co.jp | January 23, 2014 at 10:24 |
| 2 | E-mail | A Company, Mr./Ms. C | c@a.co.jp | January 23, 2014 at 10:25 |
| 3 | FAX | A Company, CEO | xxx-xxxx-xxxx | January 23, 2014 at 10:26 |
| 4 | E-mail | D Company, Mr./Ms. E | d@e.co.jp | February 17, 2014 at 9:01 |
| 5 | FAX | D Company, CEO | xxx-xxxx-xxxx | February 17, 2014 at 9:02 |

The table 8 indicates the setting item set as the synchronization target that is contained in the synchronization target information DB 450. Namely, the table 8 indicates the setting item of the setting information of which the server 120 permits sharing with the multifunction peripheral 110. The synchronization target information DB 450 includes the synchronization target information for each setting item. The setting item is determined in association with the setting item managed by the server 120. For example, the setting item is classified to correspond to each of the items indicated in the tables 2, 3, and 4. In this case, three types of setting items, the configuration information, the device setting information, and the user data are the setting items. As another example, the setting item can also be classified to correspond to each of the items indicated in the tables 5, 6, and 7. In this case, five types of setting items, the configuration information, the device setting information, the user device settings, the user simple settings, and the user address book are the setting items.

The synchronization target information DB 450 may be classified to correspond to further detailed items. For example, the setting item of the configuration information refers to the setting for each of the attributes indicated in the table 2. Further, the setting item of the device settings refers to the setting for each of the setting value identifiers indicated in the table 3. Further, the setting item of the user data refers to the setting for each username indicated in the table 4. Further, the setting item of the user device settings refers to the setting for each setting item indicated in the table 5. Further, the setting item of the user simple settings refers to the setting for each of the Nos. indicated in the table 6. Further, the setting item of the user address book refers to the setting for each of the Nos. indicated in the table 7.

The information sharing system according to the present exemplary embodiment can synchronize the setting information (the setting value) on a one by one basis for each of the setting items of the device settings, the setting items of the user data, the setting items of the user device settings, the setting items of the user simple settings, an item of a setting between users, and the setting items of the user address book.

In the present exemplary embodiment, the synchronization target information will be described, referring to the example in which setting items are classified into the three types. The synchronization target information is the setting that determines whether the setting item is the target to be synchronized for each data synchronization service 320. Regarding the synchronization target information for each of the setting items, equivalent information is also held on the multifunction peripheral 110 side.

TABLE 8

Table Indicating Items in Synchronization Target Setting DB

| Setting Item | Target/Not Target |
|---|---|
| Device Settings | Target |
| User Data | Target |
| Address Book | Not Target |
| Group Information | Not Target |

The table 9 indicates the data stored in the setting management DB 460. The setting management DB 460 is the database that stores the metadata regarding each of setting information managed by the server 120. The setting management DB 460 stores the setting information identifier for identifying the setting information when the server 120 communicates with the multifunction peripheral 110, the initial value, the value range, an applicable model/version, a condition of use of the setting information, a policy, and a cooperation specification. Each of the setting information managed in the setting management DB 460 may vary depending on whether the setting information exists, and the value range and the initial value of the setting information, according to the model of the multifunction peripheral 110 and the version of the firmware 300 of the multifunction peripheral 110. The table 9 indicates that the setting information identified by a setting information identifier "settings.common.sleep_time" is applicable to all individuals. Further, the table 9 indicates that the setting information identified by a setting information identifier "settings.print.density" varies in the value range and the initial value of the setting information depending on the version of the installed firmware 300 for a model B.

The setting information with the condition of its use set is an item which determines whether the condition of use is satisfied based on the configuration information. The table 9 indicates that the setting information identified by a setting information identifier "settings.send.compress_ratio" is available to only a device licensed for the transmission. In the present exemplary embodiment, the setting information is described referring to an example in which the setting information is set to the initial value if the condition of use is not satisfied, but the server 120 may perform processing for, for example, hiding a display, setting the setting information to the initial value, or omitting the setting item with respect to the setting information which does not satisfy the condition of use.

information and the like) of the multifunction peripheral 110 to be newly connected to the server 120 is not managed by the server 120. In the initial connection processing, the multifunction peripheral 110 identifies the setting item that the server 120 handles as the synchronization target (the setting item that the server 120 permits synchronizing). In the initial connection processing, the server 120 returns the response upon receiving the setting information when the multifunction peripheral 110 is connected to the server 120. This response contains information indicating whether to cause the information indicating the content of the update to be transmitted from the multifunction peripheral 110 to the server 120 when the setting information is updated in the multifunction peripheral 110 after the multifunction peripheral 110 is connected to the server 120. The server 120 returns the response indicating whether to demand the transmission of the content of the update for each of the setting items.

The flowcharts performed by the program of the multifunction peripheral 110 (FIGS. 5, 6, and 7A), and the flowcharts performed by the program of the server 120 (FIGS. 7B and 8) in the present exemplary embodiment will be described. The CPU 201 included in the multifunction

TABLE 9

Table Indicating Items in Setting Information DB

| Setting Value Identifier | Initial Value | Value Range | Model/Version | Condition |
|---|---|---|---|---|
| settings.common.sleep_time | Five Minutes | One Minute to Sixty Minutes | Common | — |
| settings.print.density | 5 | 0 to 10 | Model A/ALL Model B/V02.01 or Later | — |
| settings.print.density | 3 | 0 to 6 | Model B/V02.00 or EARLIER Model C/ALL | — |
| settings.send.compress_ratio | Standard | Low, Standard, and High | Common | Transmission License |
| settings.print.tray_position | Tray A | A, B, and C | Common | Finisher OPT |
| settings.usb_enable | ON | OFF and ON | Common | — |
| settings.auth.auth_mode | OFF | OFF and ON | Common | — |
| settings.auth.personalize | OFF | OFF and ON | Common | — |
| settings.auth.initial_screen | OFF | OFF and ON | Common | — |

Now, processing performed by the multifunction peripheral 110 in initial connection processing in which the multifunction peripheral 110 starts the synchronization with the server 120 will be described with reference to flowcharts illustrated in FIGS. 5 to 7A. Further, processing performed by the server 120 in the initial connection processing will be described with reference to flowcharts illustrated in FIGS. 7B and 8.

In the present exemplary embodiment, the initial connection processing refers to processing performed when the server 120 and this multifunction peripheral 110 are connected to each other, in such a state that the data (the setting peripheral 110 develops the program stored in the memory such as the ROM 202 into the RAM 203 and executes the developed program, by which each step in the flowcharts performed by the program of the multifunction peripheral 110 is processed. The CPU 221 included in the server 120 develops the program stored in the memory such as the ROM 222 into the RAM 223 and executes the developed program, by which each step in the flowcharts performed by the program of the server 120 is processed.

FIG. 5 is a flowchart illustrating processing performed until the multifunction peripheral 110 determines the setting item that the server 120 handles as the synchronization target, and starts the synchronization with the server 120. This flowchart is started from when the control unit 301 is called up at the time that the multifunction peripheral 110 synchronizes with the server 120.

First, in step S501, the control unit 301 of the multifunction peripheral 110 determines whether the synchronization management unit 306 of the multifunction peripheral 110 holds a synchronization list (the shared information). The synchronization list is information indicating the setting item of the setting information that the server 120 handles as the synchronization target and the apparatus itself (the multifunction peripheral 110) also handles as the synchronization target. This synchronization list is the shared information indicating the setting item of the setting information that the multifunction peripheral 110 shares with the server 120.

For example, the synchronization list held by the multifunction peripheral 110 indicates that the multifunction peripheral 110 shares the user data with the server 120 as the setting information.

If the multifunction peripheral 110 has never been connected to the server 120, the multifunction peripheral 110 does not hold the synchronization list. On the other hand, once the multifunction peripheral 110 is connected to the server 120, the multifunction peripheral 110 generates the synchronization list by performing processes of steps S506 to S509, which will be described below. If the connection between the multifunction peripheral 110 and the server 120 is temporarily suspended, and the multifunction peripheral 110 is connected to the server 120 again, the multifunction peripheral 110 holdings the synchronization list.

When the multifunction peripheral 110 is connected to the server 120 with the shared information stored in the synchronization management unit 306 in this manner, the multifunction peripheral 110 transmits the setting information of the setting item determined based on the shared information to the server 120. On the other hand, when the multifunction peripheral 110 is connected to the server 120 without the shared information stored in the synchronization management unit 306, the multifunction peripheral 110 transmits the setting information of all of the setting items that the multifunction peripheral 110 handles as the synchronization targets to the server 120.

If the synchronization management unit 306 holds the synchronization list (YES in step S501), in steps S502 to S505, the multifunction peripheral 110 performs processing for updating the synchronization list. On the other hand, if the synchronization management unit 306 does not hold the synchronization list (NO in step S501), in steps S506 to S509, the multifunction peripheral 110 generates the synchronization list by performing the processes of these steps.

If the synchronization management unit 306 holds the synchronization list (YES in step S501), in step S502, the control unit 301 performs control to read out the synchronization target information. The synchronization target information is the permission information indicating the setting item of the setting information of which the multifunction peripheral 110 permits sharing with the server 120 among the setting information held by the multifunction peripheral 110. In other words, the synchronization target information is the setting item of the setting information that the multifunction peripheral 110 handles as the target of the synchronization.

The setting item that the multifunction peripheral 110 handles as the target to be synchronized with the server 120 varies depending on the model of the multifunction peripheral 110, the version of the firmware 300 of the multifunction peripheral 110, and the like. For example, the multifunction peripheral 110 can handle the device settings and the user data as the synchronization targets. Further, the multifunction peripheral 110 can handle the address book information as the synchronization target in addition to the device settings and the user data. In the present exemplary embodiment, the synchronization target information is held in a file format in the HDD 204 of the multifunction peripheral 110.

Even the setting item that the multifunction peripheral 110 handles as the synchronization target is not necessarily synchronized with the server 120. The setting information of the setting item that the server 120 does not handle as the target of the synchronization is not synchronized between the server 120 and the multifunction peripheral 110 even when this setting item is the setting item that the multifunction peripheral 110 handles as the target of the synchronization.

In step S502, the control unit 301 causes the item management unit 307 to select one setting item from among a plurality of setting items handled as the targets of the synchronization via the synchronization management unit 306. The control unit 301 causes the item management unit 307 to select the setting item which is not yet selected by the item management unit 307 from among the setting items indicated in the synchronization target information, and the processing proceeds to step S503.

In step S503, the synchronization management unit 306 determines whether the setting item selected by the item management unit 307 is registered in the synchronization list. In other words, in step S503, the synchronization management unit 306 determines whether each of the setting items of which the multifunction peripheral 110 permits the synchronization is contained in the list of setting item(s) that the multifunction peripheral 110 synchronizes with the server 120. If the selected setting item is registered in the synchronization list (YES in step S503), the processing proceeds to step S504. If the selected setting item is not registered in the synchronization list (NO in step S503), the processing proceeds to step S505.

In step S504, the synchronization management unit 306 instructs the synchronization control unit 308 to synchronize the setting item selected in step S502 with the server 120. Then, the processing proceeds to step S505. That is, the setting information of the setting item in which the synchronization list indicating the sharing with the server 120 and the setting item indicating that the sharing of the synchronization target information with the server 120 is permitted is specified as the setting item to be actually synchronized with the server 120.

In step S505, the synchronization management unit 306 confirms with the item management unit 307 whether all of the setting items contained in the synchronization target information have been already selected. If all of the setting items have been already selected (YES in step S505), the processing proceeds to step S510. If there is a setting item that has not been selected yet (NO in step S505), the processing proceeds to step S502.

In step S510, the control unit 301 determines a synchronization state between the multifunction peripheral 110 and the server 120. If the multifunction peripheral 110 and the server 120 are in a non-synchronous state (YES in step S510), the processing proceeds to step S511. If the multifunction peripheral 110 and the server 120 are in a synchronization starting state (NO in step S510), the processing proceeds to step S512.

In step S511, the control unit 301 performs the initial connection processing, which is the processing for starting the synchronization from the non-synchronous state. Details of the initial connection processing will be described below with reference to FIG. 6. Upon completion of the initial connection processing, the present flowchart is ended.

In step S512, the multifunction peripheral 110 transmits the content of the update made to the setting information in the multifunction peripheral 110 to the server 120 with respect to the setting item determined to be synchronized by the processes of steps S502 to S509. This content of the update is the current value of the setting value in which a difference exists when a comparison is made between the setting information synchronized with the server 120 when the processing for synchronizing with the server 120 has been performed last time, and the setting information currently held by the multifunction peripheral 110. When the processing for synchronizing with the server 120 is performed, the time measurement unit 214 of the multifunction peripheral 110 measures a synchronization time, and records the synchronization time in the HDD 204. The multifunction peripheral 110 can identify the setting item of the setting information updated following the last synchronization by comparing the synchronization time recorded in the HDD 204 with the current time measured by the time measurement unit 214. If there is no record indicating the execution of the processing for synchronizing with the server 120, the multifunction peripheral 110 transmits the current values to the server 120 with respect to all of the setting items determined to be synchronized by the processes of steps S502 to S509. After the process of step S512 is performed, the present flowchart is ended.

Next, the processing will be described, focusing on the steps that the processing proceeds to if the control unit 301 determines that the synchronization management unit 306 does not hold the synchronization list in step S501 (NO in step S501). In the present exemplary embodiment, if the multifunction peripheral 110 does not hold the synchronization list, the multifunction peripheral 110 performs processing for generating the synchronization list to place all setting information of which the multifunction peripheral 110 permits the synchronization, in the synchronization list. As described above, if the control unit 301 determines that the synchronization management unit 306 does not hold the synchronization list (NO in step S501), the processing proceeds to step S506.

In step S506, the control unit 301 instructs the synchronization management unit 306 to read out the synchronization target information. The synchronization management unit 306 instructs the item management unit 307 to select the setting item not selected yet from the synchronization target information, and the processing proceeds to step S507.

In step S507, the synchronization management unit 306 adds the information indicating the selected setting item to the synchronization list. Then, the processing proceeds to step S508.

In step S508, the synchronization management unit 306 instructs the synchronization control unit 308 to synchronize the setting item selected in step S506 with the server 120. Then, the processing proceeds to step S509.

In step S509, the synchronization management unit 306 confirms with the item management unit 307 whether all of the setting items indicated in the synchronization target information have been selected. If all of the setting items have been selected (YES in step S509), the processing proceeds to step S510. If there is a setting item that has not been selected yet (NO in step S509), the processing proceeds to step S506. The synchronization list is generated by the processes from steps S506 to S509. In the processes of step S510 and the steps subsequent thereto, the processing for starting the synchronization with the server 120 is performed as described above.

Next, the details of the initial connection processing performed in step S511 illustrated in FIG. 5 will be described with reference to FIG. 6.

First, in step S601, the control unit 301 confirms whether there is an initial connection request with respect to any setting item among the synchronization request(s) recorded in the control unit 301. The synchronization control unit 308 generates the synchronization request and records the generated synchronization request in the control unit 301 at a predetermined timing. For example, the synchronization control unit 308 regularly issues and records the synchronization request to synchronize the content of the update made to the setting information for each of the setting items after the multifunction peripheral 110 is started up. The initial connection request refers to the synchronization request with respect to the setting item that has never been synchronized with the server 120 among the setting items handled as the targets regarding the synchronization requests.

The initial connection request is generated by the synchronization control unit 308, and the setting information is synchronized with the server 120 sequentially. Regarding the synchronization request other than the initial connection request, the setting management unit 324 makes the synchronization request to the synchronization control unit 308 every time the setting value is changed in the multifunction peripheral 110.

If there is the initial connection request in step S601 (YES in step S601), the processing proceeds to step S602. If there is not the initial connection request in step S601 (NO in step S601), the processing proceeds to step S603.

If there is the setting information with respect to which the initial connection processing should be performed (YES in step S601), in step S602, the control unit 301 reads out the unprocessed existing initial connection request, and records a setting item to which the read initial connection request has been made. Then, the processing proceeds to step S604.

If there is not the setting information with respect to which the initial connection processing should be performed (NO in step S601), in step S603, the control unit 301 acquires the setting item registered in the synchronization list from the synchronization management unit 306. Then, the control unit 301 generates the initial connection request(s) with respect to all of the setting item(s) registered in the synchronization list. Then, the control unit 301 records a setting item to which the generated initial connection request has been made, and the processing proceeds to step S604.

In step S604, the control unit 301 confirms whether there is a request regarding the setting item that is the configuration information among the recorded initial connection request(s). If there is the initial connection request regarding the configuration information (YES in step S604), the processing proceeds to step S606. If there is not the initial connection request regarding the configuration information (NO in step S604), the processing proceeds to step S605.

In step S605, the control unit 301 selects any one initial connection request from among the unprocessed initial connection request(s). Then, the processing proceeds to step S607.

In step S606, the control unit 301 selects the initial connection request regarding the configuration information from among the unprocessed initial connection request(s). Then, the processing proceeds to step S607.

In step S607, the control unit 301 identifies the setting item with respect to which the initial connection request selected in step S605 or S606 is processed, and requests the synchronization control unit 308 of this setting item to perform the synchronization processing at the time of the initial connection. The synchronization processing at the time of the initial connection will be described in detail below with reference to FIG. 7. When the synchronization processing ends at the time of the initial connection, the processing proceeds to step S608.

In step S608, the control unit 301 determines a result of the synchronization processing performed in step S607. If the result of the synchronization processing is a success (SUCCESS in step S608), the processing proceeds to step S609. If the result of the synchronization processing is an error due to the setting item that is not the synchronization target (ERROR DUE TO SETTING ITEM THAT IS NOT SYNCHRONIZATION TARGET in step S608), the processing proceeds to step S610. If the result of the synchronization is an error that cannot be retried (ERROR THAT CANNOT BE RETRIED in step S608), the processing proceeds to step S613. If the result of the synchronization is another error (ANOTHER ERROR in step S608), the processing proceeds to step S614. The error due to the setting item that is not the synchronization target is the response for instructing the multifunction peripheral 110 not to transmit the information indicating the content of the update made to the setting information of the setting item handled as the target in the multifunction peripheral 110 after the server 120 and the multifunction peripheral 110 are connected to each other.

In step S609, the control unit 301 deletes the initial connection request carried out in step S607. Then, the processing proceeds to step S615.

In step S610, the control unit 301 requests the synchronization management unit 306 to delete the setting item regarding the initial connection request carried out in step S607 from the synchronization list. The synchronization management unit 306 deletes the requested setting item from the synchronization list, and the processing proceeds to step S611.

In step S611, the control unit 301 ends the processing of the synchronization control unit 308 with respect to the setting item deleted in step S610. When the processing of the synchronization control unit 308 ends, the processing proceeds to step S612. In step S612, the control unit 301 deletes the initial connection request carried out in step S607. Then, the processing proceeds to step S615.

In this manner, the multifunction peripheral 110 deletes, from the synchronization list, the setting item for which the response for instructing the multifunction peripheral 110 not to transmit the information indicating the content of the update to the server 120 has been received, thereby preventing this setting item from remaining in the synchronization list. This deletion allows the multifunction peripheral 110 to refrain from transmitting the information indicating the content of the update to the server 120 with respect to this setting item next time the synchronization processing is performed, even if the setting item is updated.

In other words, the multifunction peripheral 110 performs control to update the synchronization list with respect to the setting item for which the response for instructing the multifunction peripheral 110 not to transmit the information indicating the content of the update has been received, and to remove this setting item from the targets of the synchronization with the server 120.

In the present exemplary embodiment, the initial connection processing has been described referring to the example that deletes the setting item from the synchronization list with respect to which the multifunction peripheral 110 has been instructed not to get into synchronization from the server 120, but is not limited thereto. The multifunction peripheral 110 may be configured to store from the server 120 into the HDD 204 information for identifying the setting item with which the multifunction peripheral 110 has been instructed not to synchronize. For example, the multifunction peripheral 110 may be configured to set a flag to the setting item so that the setting item is prevented from being synchronized. Then, the multifunction peripheral 110 can also perform control not to perform the processing for synchronizing with the server 120 after that with respect to this setting item stored in the HDD 204.

In step S613, the control unit 301 notifies the user of a failure in executing the initial connection request carried out in step S607. As a method for notifying the user, the control unit 301 makes a notification to an operation control unit that controls the operation unit 210, and displays an error message on the operation unit 210. Upon completion of the display of the error message, the initial connection processing and the present flowchart are ended.

In step S614, the control unit 301 waits for a predetermined time before retrying the initial connection request carried out in the step S607. After that, the processing proceeds to step S607 to retry the initial connection request.

In step S615, the control unit 301 confirms whether there is an unprocessed initial connection request. If there is an unprocessed initial connection request (YES in step S615), the processing proceeds to step S605. If there is no unprocessed initial connection request (NO in step S615), the processing proceeds to step S616.

In step S616, the control unit 301 determines that the initial connection processing has been completed, and changes the synchronization state to the synchronization starting state. The control unit 301 makes a notification to the operation control unit that controls the operation unit 210, and produces a display that the multifunction peripheral 110 is in the synchronization starting state on the operation unit 210. Upon ends of the change processing and the notification processing, the present flowchart is ended.

FIGS. 7A and 7B are flowcharts illustrating details of the synchronization processing at the time of the initial connection that is carried out in step S607 illustrated in FIG. 6. The flowchart illustrated in FIG. 7A is called up and performed when the synchronization control unit 308 performs step S607. FIG. 7A illustrates processing performed by the multifunction peripheral 110, and FIG. 7B illustrates processing performed by the server 120.

In step S701, the synchronization control unit 308 reads out the initial connection request selected in step S605 or S606. Then, the processing proceeds to step S702.

In step S702, the synchronization control unit 308 generates the initial connection request to be transmitted to the data synchronization service 320, from the content of the received request for the initial connection processing and the setting item to be synchronized. The content of the initial connection request varies depending on the setting item.

For example, if the setting item is the configuration information, the synchronization control unit 308 requests the configuration information from the configuration information management unit 302. The configuration information management unit 302 acquires the configuration information recorded in the configuration information holding unit 303, and transfers the acquired configuration information to the synchronization control unit 308. The synchronization control unit 308 generates the initial connection request based on the received configuration information. If the setting item is the user data, the synchronization control unit 308 requests the user data held by the multifunction peripheral 110 from the setting management unit 304. The setting management unit 304 reads out all of user data that the setting holding unit 305 holds as the synchronization target(s), and transfers the read user data to the synchronization control unit 308. The synchronization control unit 308 generates the initial connection request based on the acquired user data. Upon completing the generation of the initial connection request, the synchronization control unit 308 requests the synchronization communication unit 309 to transmit the initial connection request to the server 120. The synchronization communication unit 309 transmits the received request to the data synchronization service 320 of the server 120, and the processing proceeds to step S703.

In step S703, the synchronization communication unit 321 of the data synchronization service 320 receives the initial connection request transmitted from the multifunction peripheral 110. Then, the synchronization communication unit 321 identifies a setting item which is subject to the received initial connection request, and the processing proceeds to step S704.

In step S704, the synchronization communication unit 321 requests the setting item handled as the synchronization target from the synchronization target management unit 326. The synchronization target management unit 326 reads in the synchronization target information held by the synchronization target holding unit 327, and transfers the read synchronization target information to the synchronization communication unit 321. Then, the processing proceeds to step S705. This synchronization target information is the shared information indicating the setting item of the setting information of which the server 120 permits the sharing with the multifunction peripheral 110.

In step S705, the synchronization communication unit 321 determines whether the setting item regarding the received initial connection request is contained in the synchronization target information. If this setting item is contained in the synchronization target information (YES in step S705), the processing proceeds to step S706. If this setting item is not contained in the synchronization target information (NO in step S705), the processing proceeds to step S707.

In step S706, the synchronization communication unit 321 determines the setting item from the received initial connection request and processes the request according to the setting item. For example, if the setting item is the configuration information, the synchronization communication unit 321 confirms whether the device information with respect to which the initial connection request has been received is already registered in the device management unit 322. The device management unit 322 checks whether the device to be confirmed according to the request is registered in the configuration information holding unit 323, and transfers a result of the confirmation. If the device is not registered, the synchronization communication unit 321 requests the device management unit 322 to register the configuration information received via the initial connection request. The device management unit 322 requests the configuration information holding unit 323 to register the received configuration information. The configuration information holding unit 323 records the received configuration information in the configuration information DB 412. Then, the configuration information holding unit 323 issues the device ID, and registers the device ID and the individual identification number contained in the configuration information, in the registered device management DB 411.

On the other hand, if the setting item is the user data, the synchronization communication unit 321 requests the setting management unit 324 to set the user data with respect to which the initial connection request has been received. The setting management unit 324 divides the request to determine whose user data is contained therein from the received user data. Then, the setting management unit 324 confirms whether the user contained in the initial connection request is registered with the setting holding unit 325. The setting management unit 324 ignores the user data contained in the initial connection request if the data is already registered, while the setting management unit 324 requests the setting holding unit 325 to register the user data as new user information if the data is not registered. When the processing of the initial connection request ends, the synchronization communication unit 321 generates the response according to a result of processing the request. For example, if an error occurs in an analysis of the request while the request is processed, the processing of the initial connection request is ended with a request analysis error generated as the response. Then, upon the generation of the response, the processing proceeds to step S708.

In step S707, the synchronization communication unit 321 generates the response notifying the multifunction peripheral 110 that the setting item regarding the received initial connection request is not the synchronization target. Then, the processing proceeds to step S708.

In step S708, the synchronization communication unit 321 transmits the response generated in step S706 or S707 in response to the request received in step S703. This response indicates whether to cause the information indicating the content of the update to be transmitted from the multifunction peripheral 110 to the server 120. When the response is transmitted, the processing proceeds to step S709.

In this manner, in steps S706 and S708, the server 120 transmits the response for causing the information indicating the content of the update to be transmitted from the multifunction peripheral 110 to the server 120 with respect to the setting item of the setting information of which the server 120 permits the sharing with the multifunction peripheral 110 (the setting item determined as YES in step S705).

On the other hand, in steps S707 and S708, the server 120 transmits the response for prohibiting the information indicating the content of the update from being transmitted from the multifunction peripheral 110 to the server 120 with respect to the setting item of the setting information of which the server 120 does not permit the sharing with the multifunction peripheral 110 (the setting item determined as NO in step S705).

In step S709, the synchronization communication unit 309 receives the response from the data synchronization service 320, and transfers a content of the reception to the synchronization control unit 308. The synchronization communication unit 309 receives the response to the transmission of the setting information contained in the initial connection request in step S702, from the server 120 for each setting item of the setting information. Then, the synchronization control unit 308 performs the data synchronization processing according to the content of the response, and the processing proceeds to step S710.

In step S710, the synchronization control unit 308 records a result of the communication with the data synchronization service 320 that is contained in the response received in step S709. The synchronization control unit 308 controls the network I/F 205 not to transmit the information indicating the content of the update, to the server 120 with respect to the setting information of the setting item for which a predetermined response has been received as the response. The predetermined response is the response instructing the image forming apparatus not to transmit the information indicating the content of the update made to the setting information in the multifunction peripheral 110, to the image forming apparatus. Then, the synchronization control unit 308 notifies the control unit 301, which is the source that has called up the synchronization control unit 308, of the result of the communication, and the present flowchart is ended.

A problem that has occurred in any step in the present flowchart is also treated as occurrence of the error, and the error is returned as the result of the synchronization processing.

Next, the setting processing for the setting item to be handled as the synchronization target in the server 120 will be described with reference to FIG. 8.

FIG. 8 is a flowchart illustrating processing in which the server 120 sets whether the setting item is the target or not the target, with respect to each of the setting items in the synchronization target information DB 450 indicated in the table 8. A change to the setting in the synchronization target information DB 450 is permitted only when there is not even a single multifunction peripheral 110 synchronizing with the server 120.

In other words, the HDD 224 stores the shared information (the table 8) indicating the setting item of the setting information of which the server 120 permits the sharing with the multifunction peripheral 110. The HDD 224 permits a change to the content of the shared information when the server 120 does not perform the processing for sharing the setting information with the multifunction peripheral 110. The case where the server 120 does not perform the processing for sharing the setting information with the multifunction peripheral 110 includes a case where the server 120 is not connected to the multifunction peripheral 110.

In this manner, the server 120 can prevent inconsistency from occurring between the setting of the synchronization target and the setting item that is actually synchronized, owing to the change made to the synchronization target when there is already the multifunction peripheral 110 synchronizing with the server 120.

This flowchart is performed when the synchronization target information unit 328 of the data synchronization service 320 is called up. The synchronization target information unit 328 may be called up from the display unit 230 of the server 120, or may be called up by accessing from an external device via the network I/F 227.

In step S801, the synchronization target information unit 328 receives a request to change the synchronization target. Upon the reception of the request, the processing proceeds to step S802.

In step S802, the synchronization target information unit 328 confirms with the device management unit 322 whether there is a device synchronizing with the server 120 to. The device management unit 322 confirms whether the configuration information holding unit 323 holds the configuration information. If the configuration information holding unit 323 holds the configuration information, the device management unit 322 confirms the synchronization state, and notifies the synchronization target information unit 328 of a result thereof. If the synchronization target information unit 328 confirms that there is no device synchronizing with the server 120 (NO in step S802), the processing proceeds to step S803. If there is a device synchronizing with the server 120 (YES in step S802), the processing proceeds to step S805.

In step S803, the synchronization target information unit 328 displays a screen for changing the synchronization target on a source that has called up the synchronization target information unit 328 by issuing the request to change the synchronization target. For example, the synchronization target information unit 328 displays a screen for changing the synchronization target illustrated in FIG. 9A on the display unit 230. When the change request input on the change screen is received via the operation unit 229, the processing proceeds to step S804.

In step S804, the synchronization target information unit 328 confirms a content of the received change request. If the received change request contains a change to the setting about whether the setting item is the synchronization target or not the synchronization target, with respect to any of the setting items, the synchronization target information unit 328 calls up the synchronization target management unit 326, and registers the content of the change with the synchronization target holding unit 327. For example, if the change request to set the device setting information not to be the synchronization target is received, the synchronization target information unit 328 issues a request to change the device setting information in the synchronization target holding unit 327 so as to be not the synchronization target. When the registration of the change request ends, the present flowchart is ended.

In step S805, the synchronization target information unit 328 notifies the request source that the change to the synchronization target is not permitted. For example, the synchronization target information unit 328 notifies the request source by displaying a screen illustrated in FIG. 9B on the display unit 230. Then, the present flowchart is ended.

According to the processing described with reference to FIG. 8, the server 120 can prevent the synchronization target from being inadvertently changed by mistake despite the presence of the device synchronizing with the server 120, thereby preventing the content indicating the setting item to be synchronized from being inadvertently changed in the middle of the synchronization.

In the above-described manner, according to the present exemplary embodiment, the server 120 can cause the multifunction peripheral 110 to automatically set the synchronization target such that only the setting item that the server 120 handles as the synchronization target synchronizes with the multifunction peripheral 110 during the initial connection processing. The user no longer has to set the synchronization target on the multifunction peripheral 110 every time the initial connection is established. Thus, the present exemplary embodiment can reduce a load of processing for setting the data that is not the synchronization target and the load of the communication.

Now, a second exemplary embodiment will be described. The multifunction peripheral 110 may temporarily end the synchronization with the server 120, and start the synchronization with a new server 120. At this time, it is possible that the setting item that the new server 120 handles as the synchronization target is different from the previously connected server 120, which may lead to a failure to synchronize the data that the new server 120 handles as the synchronization target. Therefore, in the present exemplary embodiment, an example will be described in which the multifunction peripheral 110 performs control to delete the shared information at the time of ending a state where the setting information is shared with the server 120.

The present exemplary embodiment will be described, omitting descriptions regarding similar features to the first exemplary embodiment and focusing on only features characteristic of the present exemplary embodiment.

FIG. 10 is a flowchart illustrating processing in which the multifunction peripheral 110 ends the synchronization with the server 120. This flowchart is started from when the multifunction peripheral 110 receives a synchronization end request. The synchronization end request is notified to the control unit 301 by indicating to the operation unit 210 of the multifunction peripheral 110.

In step S1001, the control unit 301 receives the synchronization end request. Then, the processing proceeds to step S1002.

In step S1002, the control unit 301 acquires the setting item(s) registered with the synchronization list from the synchronization management unit 306. Then, the control unit 301 generates an end processing request with respect to all of the setting item registered with the synchronization list. Then, the control unit 301 records a setting item which is subject to the generated end processing request, and the processing proceeds to step S1003.

In step S1003, the control unit 301 selects any one end processing request among the unprocessed end processing request(s). Then, the processing proceeds to step S1004.

In step S1004, the control unit 301 identifies the setting item with respect to which the end processing request selected in step S1003 is processed, and requests the synchronization control unit 308 of this setting item to perform the end processing. The end processing will be described in detail below with reference to FIGS. 11A and 11B. Upon reception of a result of the end processing from the synchronization control unit 308, the processing proceeds to step S1005.

In step S1005, the control unit 301 deletes the end processing request carried out in step S1004. Then, the processing proceeds to step S1006.

In step S1006, the control unit 301 ends the processing of the synchronization control unit 308 with respect to which the end processing has been requested in step S1004. Upon the end of the processing of the synchronization control unit 308, the processing proceeds to step S1007.

In step S1007, the control unit 301 confirms whether there is an unprocessed end processing request. If there is an unprocessed end processing request (YES in step S1007), the processing proceeds to step S1003. If there is no unprocessed end processing request (NO in step S1007), the processing proceeds to step S1008.

In step S1008, the control unit 301 requests the synchronization target management unit 306 to delete the synchronization list. After deleting the synchronization list, the synchronization target management unit 306 notifies the control unit 301 thereof. When the control unit 301 receives the notification indicating that the synchronization list has been deleted, the processing proceeds to step S1009.

In step S1009, the control unit 301 determines that the processing for ending the synchronization has been completed, and changes the synchronization state to the non-synchronous state. The control unit 301 sends a notification to the operation control unit that controls the operation unit 210, and displays that the multifunction peripheral 110 is in the non-synchronous state on the operation unit 210. When the change processing and the notification processing end, the present flowchart is ended.

FIGS. 11A and 11B are flowcharts illustrating details of synchronization of the end processing that is performed in step S1004 illustrated in FIG. 10. FIG. 11A is processing performed by the multifunction peripheral 110. Further, FIG. 11B is processing performed by the server 120. The flowchart illustrated in FIG. 11A is performed when the synchronization control unit 308 is requested to synchronize the end processing in step S1004.

In step S1101, the synchronization control unit 308 receives the end processing request selected in step S1003, and reads out the end processing request. Then, the processing proceeds to step S1102.

In step S1102, the synchronization control unit 308 determines whether the setting item regarding the end processing request is the setting item managed by the multifunction peripheral 110 itself which requires the end processing. Whether the end processing is required means whether the server 120 manages the setting item as individual data of the multifunction peripheral 110. For example, the configuration information and the device setting information are the individual data, which is managed in such a manner that the data in the multifunction peripheral 110 and the data in the server 120 are associated with each other one to one. Therefore, when the multifunction peripheral 110 ends the synchronization, the individual data thereof should be deleted. On the other hand, the user data is data shared between a plurality of multifunction peripherals 110, and even when one multifunction peripheral 110 stops the synchronization, the data cannot be deleted because it continues to be used by the other multifunction peripheral(s) 110. Therefore, the user data can be determined to be the setting item with respect to which the end processing is unnecessary. If the setting item regarding the end processing request is an item with respect to which the end processing is necessary (YES in step S1102), the processing proceeds to step S1103. If the setting item is an item with respect to which the end processing is unnecessary (NO in step S1102), the present flowchart is ended.

In step S1103, the synchronization control unit 308 generates an end processing request to be transmitted to the data synchronization service 320 from the content of the received request for the end processing and the setting item to be synchronized. The setting item is recorded in the end processing request. Upon completing the generation of the end processing request, the synchronization control unit 308 requests the synchronization communication unit 309 to transmit the end processing request to the data synchronization service 320. The synchronization communication unit 309 transmits the received request to the data synchronization service 320, and the processing proceeds to step S1104.

In step S1104, the synchronization communication unit 321 of the data synchronization service 320 receives the end processing request transmitted from the multifunction peripheral 110. Then, the synchronization communication unit 321 identifies a setting item which is subject to the end processing request, and the processing proceeds to step S1105.

In step S1105, the synchronization communication unit 321 determines the setting item from the received end processing request, and performs end processing according to the setting item. For example, if the setting item is the configuration information, the synchronization communication unit 321 requests the device management unit 322 to delete the configuration information of the device that has issued the request. The device management unit 322 deletes the configuration information from the configuration information DB 412 via the configuration information holding unit 323, and also deletes the record of this device from the registered device management DB 411. When the processing of the end processing request is ended, the synchronization communication unit 321 generates a response according to a result of processing the request, and the processing proceeds to step S1106.

In step S1106, the synchronization communication unit 321 transmits the response generated in step S1105 in response to the request received in step S1104. After the response is transmitted, the processing proceeds to step S1107.

In step S1107, the synchronization communication unit 309 receives the response from the data synchronization service 320, and transfers a received content to the synchronization control unit 308. The synchronization control unit 308 executes the synchronization control unit 308 according to the content of the response, and the processing proceeds to step S1108.

In step S1108, the synchronization control unit 308 records a result of the communication with the data synchronization service 320 that is contained in the response received in step S1107. Then, the synchronization control unit 308 notifies the control unit 301, which is the source that has called up the synchronization control unit 308, of the result of the communication, and the present flowchart is ended.

In this manner, according to the present exemplary embodiment, the processing is performed that deletes the entire synchronization list when the multifunction peripheral 110 ends the synchronization with the server 120. This deletion allows the multifunction peripheral 110 and the server 120 to perform the processing described in the first exemplary embodiment and start the synchronization of the setting item set as the synchronization target in the new server 120 when the multifunction peripheral 110 starts the synchronization with the new server 120.

Now, a third exemplary embodiment will be described. In the present exemplary embodiment, as an example, the multifunction peripheral 110 varies the method by which the multifunction peripheral 110 notifies the server 120 of the setting information according to the setting item of the setting information when the multifunction peripheral 110 is connected to the server 120. According to the present exemplary embodiment, a communication amount required in the initial connection processing can be reduced, and a time taken until the completion of the initial connection can be shortened.

When a plurality of multifunction peripherals is connected to the server 120, whether common setting information is used between the plurality of multifunction peripherals varies depending on the setting item of the setting information.

For example, if the setting item is the configuration information, the content of the setting information varies between the plurality of multifunction peripherals. This is because the configuration information indicating the version of the firmware, whether the multifunction peripheral is equipped with the finisher, and the like is the setting information specific to each of the multifunction peripherals, and is information inapplicable to the other multifunction peripheral(s).

On the other hand, if the setting item is the user simple settings, this setting item can be used as the setting information common between the plurality of multifunction peripherals. For example, supposing that the simple settings (the setting item) of a user A include a setting (the setting information) specifying monochrome as the print color setting, this setting can be used in common between the plurality of multifunction peripherals.

Since the configuration information is the setting information specific to each of the multifunction peripherals, when a new multifunction peripheral is connected to the server 120, the server 120 should acquire the configuration information of this newly connected multifunction peripheral. On the other hand, regarding the user simple settings, it is possible that the server 120 has already acquired the user simple settings from the already connected multifunction peripheral, and the newly connected multifunction peripheral does not have to notify the server 120 of the user simple settings.

In other words, if the multifunction peripheral newly connected to the server 120 notifies the server 120 of the user simple settings at the time of the connection, this notification may end up only wasting a time for the communication processing and a communication band used in the communication of the user simple settings.

Therefore, in the present exemplary embodiment, when the multifunction peripheral 110 is connected to the server 120, the multifunction peripheral 110 changes the method by which the multifunction peripheral 110 notifies the server 120 of the setting information according to the setting item of the setting information.

The multifunction peripheral 110 determines whether the setting information held by the multifunction peripheral 110 is the setting information shared between the plurality of multifunction peripherals connected to the server 120, or the setting information specific to each of the multifunction peripherals, for each of the setting items. Then, the multifunction peripheral 110 changes the processing for transmitting the setting information to the server 120 based on a result of the determination.

For example, the multifunction peripheral 110 transmits the setting information without confirming with the server 120 with respect to the setting information specific to the multifunction peripheral 110, such as the configuration information. In other words, the multifunction peripheral 110 transmits the setting information specific to the multifunction peripheral 110 to the information processing apparatus without performing confirmation processing, which will be described below.

On the other hand, with respect to the setting information used in common between the plurality of multifunction peripherals, such as the user simple settings, the multifunction peripheral 110 confirms with the server 120 whether the server 120 already holds this setting information before transmitting the setting information to the server 120. The multifunction peripheral 110 confirms with the server 120 whether the server 120 holds the setting information shared between the plurality of multifunction peripherals for each of the setting items.

The multifunction peripheral 110 does not transmit the setting information confirmed to be already held by the server 120. On the other hand, the multifunction peripheral 110 transmits the setting information confirmed not to be held by the server 120. In other words, the multifunction peripheral 110 transmits the setting information of the setting item confirmed not to be held by the server 120 to the server 120 with respect to the setting information shared between the plurality of multifunction peripherals connected to the server 120.

In this manner, the communication amount required for the initial connection processing can be reduced, and the time taken until the completion of the initial connection can be shortened.

Now, details of the present exemplary embodiment will be described. The present exemplary embodiment will be described, omitting descriptions of features similar to the first or second exemplary embodiment.

FIG. 12 is a flowchart illustrating initial connection processing performed for the multifunction peripheral 110 to start the synchronization with the data synchronization service 320 according to the present exemplary embodiment. This flowchart is called up from step S511 illustrated in FIG. 5 and performed. The present flowchart includes similar processes to the flowchart illustrated in FIG. 6, and therefore will be described omitting descriptions of the similar processes.

Steps S601 to S606 are the similar processes to the flowchart illustrated in FIG. 6, and therefore descriptions thereof will be omitted here. When the process of step S605 or S606 ends, the processing proceeds to step S1201.

In step S1201, the control unit 301 confirms the setting item regarding the initial connection request selected in step S605 or S606, and processes the setting item associated therewith. The control unit 301 requests the synchronization control unit 308 to process the initial connection request. The synchronization control unit 308 determines whether the data to be processed by the synchronization control unit 308 itself is treated as the individual data by the data synchronization service 320. If this data is treated as the individual data (YES in step S1201), the processing proceeds to step S607. If not (NO in step S1201), the processing proceeds to step S1202.

In step S1202, the synchronization control unit 308 performs shared data initial synchronization processing. The shared data initial synchronization processing will be described in detail below with reference to FIGS. 13A and 13B. When the shared data initial synchronization processing ends, the synchronization control unit 308 notifies the control unit 301 of a result of the processing, and the processing proceeds to step S608. Steps S607 to S616 are the similar processes to the flowchart illustrated in FIG. 6, and therefore descriptions thereof will be omitted here.

FIGS. 13A and 13B are flowcharts illustrating details of the synchronization processing at the time of the initial connection for the shared data that is performed in step S1202 illustrated in FIG. 12. FIG. 13A is processing performed by the multifunction peripheral 110. Further, FIG. 13B is processing performed by the server 120. The flowchart illustrated in FIG. 13A is called up and performed when the synchronization control unit 308 receives the initial connection request for the shared data in step S1202.

In step S1301, the synchronization control unit 308 reads out the received request for the initial connection processing. Then, the processing proceeds to step S1302.

In step S1302, the synchronization control unit 308 generates a data confirmation request to be transmitted to the data synchronization service 320 from the content of the received request for the initial connection processing for the shared data, and the setting item to be synchronized. The content of the data confirmation request varies depending on the setting item. For example, if the setting item is the user data, the synchronization control unit 308 for the user data requests the username whose user data is held by the multifunction peripheral 110 from the setting management unit 304. The setting management unit 304 transfers the username of the user whose user data is held by the setting holding unit 305 to the synchronization control unit 308. The synchronization control unit 308 generates the data confirmation request based on the acquired user. Upon completing the generation of the data confirmation request, the synchronization control unit 308 requests the synchronization communication unit 309 to transmit the data confirmation request to the data synchronization service 320. The synchronization communication unit 309 transmits the received request to the data synchronization service 320, and the processing proceeds to step S1303.

In step S1303, the synchronization communication unit 321 of the data synchronization service 320 receives the data confirmation request transmitted from the multifunction peripheral 110. Then, the synchronization communication unit 321 identifies a setting item which is subject to the data confirmation request, and the processing proceeds to step S1304.

In step S1304, the synchronization communication unit 321 requests the setting item handled as the synchronization target from the synchronization target management unit 326. The synchronization target management unit 326 reads in the synchronization target information held by the synchronization target holding unit 327, and transfers the read synchronization target information to the synchronization communication unit 321. Then, the processing proceeds to step S1305.

In step S1305, the synchronization communication unit 321 determines whether the setting item regarding the received data confirmation request is contained in the synchronization targets. If this setting item is contained in the synchronization targets (YES in step S1305), the processing proceeds to step S1306. If this setting item is not contained in the synchronization targets (NO in step S1305), the processing proceeds to step S1307.

In step S1306, the synchronization communication unit 321 determines the setting item from the received data confirmation request, and performs the processing of the request according to the setting item. For example, if the setting item is the user data, the synchronization communication unit 321 confirms with the setting management unit 324 whether the user data of the user contained in the data confirmation request is registered. The setting management unit 324 confirms whose user data is registered from the received user via the setting holding unit 325, and notifies the synchronization communication unit 321 of a result of the confirmation. The synchronization communication unit 321 generates the response according to whether the user data is registered. Upon the generation of the response, the processing proceeds to step S1308.

In step S1307, the synchronization communication unit 321 generates the response notifying the multifunction peripheral 110 that the setting item regarding the received data confirmation request is not the synchronization target. Then, the processing proceeds to step S1308.

In step S1308, the synchronization communication unit 321 transmits the response generated in step S1306 or S1307 in response to the request received in step S1303. Upon the transmission of the response, the processing proceeds to step S1309.

In step S1309, the synchronization communication unit 309 receives the response from the data synchronization service 320, and transfers the received response to the synchronization control unit 308. The synchronization control unit 308 reads out a result of the communication from the response, and the processing proceeds to step S1310.

In step S1310, the synchronization control unit 308 records the result of the communication with the data synchronization service 320 that is contained in the response received in step S1309. Then, the synchronization control unit 308 notifies the control unit 301, which is the source that has called up the synchronization control unit 308, of the result of the communication, and the processing proceeds to step S1311.

In step S1311, the synchronization control unit 308 determines whether the result of the communication is a success. If the result of the communication is a success (YES in step S1311), the processing proceeds to step S1312. If the result of the communication is a result other than a success (NO in step S1311), the synchronization control unit 308 notifies the control unit 301 of the result of the communication, and the present flowchart is ended.

In step S1312, the synchronization control unit 308 reads out a result of the data confirmation from the response received in step S1309. If the result of the data confirmation indicates that there is data unregistered with the data synchronization service 320 (YES in step S1312), the processing proceeds to step S1313. If there is no data unregistered with the data synchronization service 320 (NO in step S1312), the synchronization control unit 308 notifies the control unit 301 of the result of the communication, and the present flowchart is ended.

In step S1313, the synchronization control unit 308 generates a data sharing request to transmit the unregistered data confirmed in step S1312. The synchronization control unit 308 requests the setting management unit 304 to acquire the unregistered data. The setting management unit 304 reads out the specified data from the setting holding unit 305, and notifies the synchronization control unit 308 of a result thereof. The synchronization control unit 308 generates the data sharing request from the received data. Upon completing the generation of the request, the synchronization control unit 308 requests the synchronization communication unit 309 to transmit the data sharing request to the data synchronization service 320. The synchronization communication unit 309 transmits the received request to the data synchronization service 320, and the processing proceeds to step S1314.

In step S1314, the synchronization communication unit 321 of the data synchronization service 320 receives the data sharing request transmitted from the multifunction peripheral 110. Then, the synchronization communication unit 321 identifies a setting item which is subject to the data sharing request, and the processing proceeds to step S1315.

In step S1315, the synchronization communication unit 321 determines the setting item from the received data sharing request, and carries out the sharing of the data according to the setting item. For example, if the setting item is the user data, the synchronization communication unit 321 reads out the user data from the data sharing request, and requests the setting management unit 324 to register the read user data. The setting management unit 324 registers the requested user data with the user data DB 441 within the device via the setting holding unit 325. When the processing on all of the piece(s) of data contained in the request ends, the synchronization communication unit 321 generates a response according to a result of processing the request, and the processing proceeds to step S1316.

In step S1316, the synchronization communication unit 321 transmits the response generated in step S1315 in response to the request received in step S1314. After the transmission of the response, the processing proceeds to step S1317.

In step S1317, the synchronization communication unit 309 receives the response from the data synchronization service 320, and transfers a content of the reception to the synchronization control unit 308. The synchronization control unit 308 executes the synchronization control unit 308 according to the content of the response, and the processing proceeds to step S1318.

In step S1318, the synchronization control unit 308 records a result of the communication with the data synchronization service 320 that is contained in the response received in step S1317. Then, the synchronization control unit 308 notifies the control unit 301, which is the source that has called up the synchronization control unit 308, of the result of the communication, and the present flowchart is ended.

In the above-described manner, according to the present exemplary embodiment, the multifunction peripheral 110 can determine whether to transmit the data or whether to transmit the data confirmation for each of the setting items at the time of the initial connection processing to appropriately perform the initial connection processing, and also confirm whether the setting item is the synchronization target from the result of this communication. The communication amount required for the initial connection processing can be reduced, and the time taken until the completion of the initial connection can be shortened, regardless of a setting status of the synchronization target.

Now, a fourth exemplary embodiment will be described. The above-described exemplary embodiments have been described, referring to the example in which the server returns the response on a one by one basis for each of the setting values according to the reception of the setting information from the client. However, the present invention is not limited thereto. A similar effect can also be achieved by, for example, causing the server to notify the client of the setting item that the server 120 can synchronize, and receive a response indicating a synchronization target item from the client during the initial connection processing.

In other words, the server may be configured to transmit to the client information for identifying the setting item with respect to which the client transmits the information indicating the content of the update made to the setting value in the client to the server, when the client is connected to the server.

In the following description, the present exemplary embodiment will be described referring to the example in which the client is the multifunction peripheral 110, similarly to the above-described exemplary embodiments.

A system configuration according to the present exemplary embodiment is similar to the system configuration described in the first exemplary embodiment, and therefore a description thereof will be omitted here.

Initial connection processing according to the present exemplary embodiment will be described with reference to FIGS. 14A and 14B. The CPU 201 included in the multifunction peripheral 110 develops the program stored in the memory such as the ROM 202 into the RAM 203 and executes the developed program, by which each step in the flowchart performed by the multifunction peripheral 110 is processed. The CPU 221 included in the server 120 develops the program stored in the memory such as the ROM 222 into the RAM 223 and executes the developed program, by which each step in the flowchart performed by the server 120 is processed.

In step S1401, the server 120 detects a connection of the new multifunction peripheral 110 to the server 120. Upon this detection, in step S1402, the server 120 notifies this newly connected client of the information indicating the setting item that the server 120 can synchronize. How this notification is carried out is not especially limited. For example, the server 120 can transmit a file indicating a list of setting item(s) that the server 120 can handle as the synchronization target(s) to the multifunction peripheral 110.

In step S1403, the multifunction peripheral 110 receives the information indicating the setting item that the server 120 can synchronize from the server 120. Next, in step S1404, the multifunction peripheral 110 selects the setting item that the multifunction peripheral 110 handles as the synchronization target among the setting item(s) that the server 120 can synchronize, which is/are indicated in the received information. The multifunction peripheral 110 can select the setting item that the multifunction peripheral 110 handles as the synchronization target based on, for example, the setting item managed by the multifunction peripheral 110 itself or the configuration information indicating the apparatus configuration of the multifunction peripheral 110 itself.

Next, in step S1405, the multifunction peripheral 110 registers the selected synchronization target item within the multifunction peripheral 110 itself. The synchronization target item registered in step S1405 is the setting item to be handled as the target with respect to which, after that, when the setting value is updated in the multifunction peripheral 110, the multifunction peripheral 110 notifies the server 120 of the content of this update. The multifunction peripheral 110 notifies the server 120 of the update by referring to the registered synchronization target item.

Next, in step S1406, the multifunction peripheral 110 transmits the setting value of the setting item selected in step S1404 to the server 120.

In step S1407, when the server 120 receives the setting value from the multifunction peripheral 110, in step S1408, the server 120 registers this setting value with the setting information DB 420. This processing also allows the multifunction peripheral 110 to determine the setting item to be handled as the synchronization target between the server 120 and the multifunction peripheral 110.

Other Exemplary Embodiments

The first, second, third, and fourth exemplary embodiments have been described. However, the above-described exemplary embodiments are mere examples when the present invention is embodied. The respective processing procedures and operations of the exemplary embodiments may be realized if combined or may be realized selectively. The present invention is not limited to the configurations of the exemplary embodiments.

Further, the client in the present invention does not have to be limited to the configuration as the multifunction peripheral, and the present invention is applicable to, for example, an information device terminal that is a device managing the setting information and that holds the setting information varying depending on the information configuring the device. For example, the present invention is applicable to an image forming apparatus including a personal computer, a mobile phone terminal, a smartphone terminal, a single function printer (SFP) equipped with only the print function, and the like, and an information processing apparatus configured as an electronic watch, an electronic organizer, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus configured to manage setting information of an image forming apparatus, the information processing apparatus comprising:
   a memory device that stores a set of instructions; and
   at least one processor that executes the instructions to:
      transmit, to the image forming apparatus, type information indicating type of setting item which is to be received from the image forming apparatus by the information processing apparatus; and
      receive, in a case where a setting item stored by the image forming apparatus is updated and a type of the setting item which is updated is the type indicated by the type information, update information of the setting item of the image forming apparatus, wherein the update information of the setting item of the image forming apparatus is not received in a case where the setting item stored by the image forming apparatus is updated and a type of the setting item which is updated is not the type indicated by the type information.

2. The information processing apparatus according to claim 1, wherein the at least one processor executes instructions in the memory device to:
   receive the setting item which is updated after the setting item had been previously shared between the image forming apparatus and the information processing apparatus, from the image forming apparatus as the update information.

3. The information processing apparatus according to claim 1, further comprising a storage configured to store the type information used for determining whether a type of the setting item is to be or not to be shared by the information processing apparatus and the image forming apparatus, wherein a change of a content of the type information in the storage is permitted in a case where the information processing apparatus is not performing processing for sharing the setting information with the image forming apparatus.

4. An image forming apparatus comprising:
a storage configured to store setting information regarding a setting of the image forming apparatus;
a memory device that stores a set of instructions; and
at least one processor that executes the instructions to:
  receive, from an information processing apparatus, type information indicating type of setting item which is to be transmitted from the image forming apparatus to the information processing apparatus; and
  transmit, in a case where a setting item stored by the storage is updated and a type of the setting item which is updated is the type indicated by the type information, update information of the setting item to the information processing apparatus,
    wherein the update information of the setting item is not transmitted in a case where the setting item stored by the image forming apparatus is updated and the type of the setting item which is updated is not the type indicated by the type information.

5. The image forming apparatus according to claim 4, wherein the at least one processor executes instructions in the memory device to:
transmit a setting item which is updated after the setting item had been previously shared between the image forming apparatus and the information processing apparatus, to the information processing apparatus as the update information.

6. The image forming apparatus according to claim 4, wherein
the storage stores the type information used for determining whether a type of the setting item is to be or not to be shared by the information processing apparatus and the image forming apparatus; and
the at least one processor executes instructions in the memory device to perform control to delete the type information from the storage in a case where sharing of the setting information by the information processing apparatus and the image forming apparatus is ended.

7. An information processing system comprising:
an information processing apparatus; and
an image forming apparatus,
the information processing apparatus comprising:
a first memory device that stores a set of instructions; and
at least one processor that executes the instructions in the first memory to:
  transmit, to the image forming apparatus, type information indicating type of setting item which is to be received from the image forming apparatus by the information processing apparatus; and
the image forming apparatus comprising:
a second memory device that stores a set of instructions; and
at least one processor that executes the instructions in the second memory to:
  receive, from the information processing apparatus, the type information; and
  transmit, in a case where a setting item stored by a storage is updated and a type of the setting item which is updated is the type indicated by the type information, update information of the setting item to the information processing apparatus,
    wherein the update information of the setting item is not transmitted in a case where the setting item stored by the image forming apparatus is updated and the type of the setting item which is updated is not the type indicated by the type information.

8. A method for controlling an information processing apparatus managing setting information regarding a setting of an image forming apparatus, the method comprising:
transmitting, to the image forming apparatus, type information indicating type of setting item which is to be received from the image forming apparatus by the information processing apparatus; and
receiving, in a case where a setting item stored by the image forming apparatus is updated and a type of the setting item which is updated is the type indicated by the type information, update information of the setting item of the image forming apparatus, wherein the update information of the setting item of the image forming apparatus is not received in a case where the setting item stored by the image forming apparatus is updated and a type of the setting item which is updated is not the type indicated by the type information.

9. A method for controlling an image forming apparatus storing setting information regarding a setting of the image forming apparatus in a storage, the method comprising:
receiving, from an information processing apparatus, type information indicating type of setting item which is to be transmitted from the image forming apparatus to the information processing apparatus; and
transmitting, in a case where a setting item stored by the storage is updated and a type of the setting item which is updated is the type indicated by the type information, update information of the setting item to the information processing apparatus,
  wherein the update information of the setting item is not transmitted in a case where the setting item stored by the image forming apparatus is updated and the type of the setting item which is updated is not the type indicated by the type information.

10. A non-transitory computer-readable storage medium storing a program for causing a computer managing setting information regarding a setting of an image forming apparatus to execute:
transmitting, to the image forming apparatus, type information indicating type of setting item which is to be received from the image forming apparatus by the information processing apparatus; and
receiving, in a case where a setting item stored by the image forming apparatus is updated and a type of the setting item which is updated is the type indicated by the type information, update information of the setting item of the image forming apparatus, wherein the update information of the setting item of the image forming apparatus is not received in a case where the setting item stored by the image forming apparatus is updated and a type of the setting item which is updated is not the type indicated by the type information.

11. A non-transitory computer-readable storage medium storing a program for causing a computer storing setting information regarding a setting of the computer in a storage to execute:
receiving, from an information processing apparatus, type information indicating type of setting item which is to be transmitted from the image forming apparatus to the information processing apparatus; and
transmitting, in a case where a setting item stored by the storage is updated and a type of the setting item which is updated is the type indicated by the type information, update information of the setting item to the information processing apparatus, wherein the update information of the setting item is not transmitted in a case where the setting item stored by the image forming apparatus is updated and the type of the setting item which is updated is not the type indicated by the type information.

* * * * *